US012627910B2

(12) United States Patent
Covey et al.

(10) Patent No.: US 12,627,910 B2
(45) Date of Patent: May 12, 2026

(54) MULTIPLEXED TELECOMMUNICATION-BAND QUANTUM NETWORKING WITH ATOM ARRAYS IN OPTICAL CAVITIES

(71) Applicants: The Board of Trustees of the University of Illinois, Urbana, IL (US); The University of Chicago, Chicago, IL (US)

(72) Inventors: Jacob Paul Covey, Savoy, IL (US); William Chiu Wong Huie, Urbana, IL (US); Jia Pern Neville Chen, Champaign, IL (US); Lintao Li, Urbana, IL (US); Hannes Bernien, Chicago, IL (US); Shankar Girijavallabhan Menon, Chicago, IL (US)

(73) Assignees: The Board of Trustees of the University of Illinois, Urbana, IL (US); The University of Chicago, Chicago, IL (US)

( * ) Notice: Subject to any disclaimer, the term of this patent is extended or adjusted under 35 U.S.C. 154(b) by 151 days.

(21) Appl. No.: 18/219,512

(22) Filed: Jul. 7, 2023

(65) Prior Publication Data

US 2024/0056711 A1     Feb. 15, 2024

Related U.S. Application Data

(60) Provisional application No. 63/359,699, filed on Jul. 8, 2022.

(51) Int. Cl.
*H04Q 11/00*     (2006.01)
*H04B 10/291*    (2013.01)
(Continued)

(52) U.S. Cl.
CPC ....... *H04Q 11/0067* (2013.01); *H04B 10/291* (2013.01); *H04B 10/70* (2013.01); *H04L 9/0855* (2013.01); *H04Q 2213/13191* (2013.01)

(58) Field of Classification Search
CPC ............ H04B 10/29–299; H04B 10/70; H04B 10/291; H04Q 11/0067; H04Q 2213/13191; H04L 9/0855
See application file for complete search history.

(56) References Cited

U.S. PATENT DOCUMENTS

| | | | | |
|---|---|---|---|---|
| 2010/0135612 A1* | 6/2010 | Waks | ..................... | G02F 1/365 385/16 |
| 2013/0083389 A1* | 4/2013 | Dakin | ..................... | G01S 17/58 359/341.1 |
| 2018/0254085 A1* | 9/2018 | Brown | ................... | H04B 10/70 |

OTHER PUBLICATIONS

Shi, "Fast, Accurate, and Realizable Two-Qubit Entangling Gates by Quantum Interference in Detuned Rabi Cycles of Rydberg Atoms" (published at https://arxiv.org/abs/1809.08957, Apr. 2019).*

(Continued)

*Primary Examiner* — Casey L Kretzer

(74) *Attorney, Agent, or Firm* — McDonnell Boehnen Hulbert & Berghoff LLP

(57) ABSTRACT

The disclosure includes a multiplexed telecommunication-band quantum network that utilizes atomic arrays in optical cavities. An example quantum networking system includes at least one quantum repeater node. The quantum repeater node includes an array of neutral atoms disposed in an optical cavity and a fiber-optic switch (FOS). The FOS is optically coupled to the optical cavity. The quantum repeater node also includes at least one beamsplitter. The at least one beamsplitter is optically coupled to the FOS.

18 Claims, 13 Drawing Sheets

(51) Int. Cl.
H04B 10/70 (2013.01)
H04L 9/08 (2006.01)

(56) References Cited

OTHER PUBLICATIONS

Utama et al, "Coupling Light to Higher Order Transverse Modes of a Near-Concentric Optical Cavity" (published at https://arxiv.org/abs/2010.14216, Oct. 2020).*

Kawasaki et al., "Geometrically asymmetric optical cavity for strong atom-photon coupling," Physical Review A, 2019, 7 pages, vol. 99.

Kimble, H.J., "The quantum internet," Nature, Jun. 19, 2008, 8 pages, vol. 453.

Kómár et al., "A quantum network of clocks," Nature Physics, Aug. 2014, pp. 582-587, vol. 10.

Langenfeld et al., "Quantum Teleportation between Remote Qubit Memories with Only a Single Photon as a Resource," Physical Review Letters, 2021, 6 pages, vol. 126.

Langenfeld et al., "Quantum Repeater Node Demonstrating Unconditionally Secure Key Distribution," Physical Review Letters, 2021, 6 pages, vol. 126.

Lauk et al., "Perspectives on quantum transduction," Quantum Science and Technology, 2020, 16 page, vol. 5.

Lee et al., "Core-shell magneto-optical trap for alkaline-earth-metal-like atoms," Physical Review, 2015, 5 pages, vol. 91.

Lengwenus et al., "Coherent Transport of Atomic Quantum States in a Scalable Shift Register," Physical Review Letter, PRL, 2010, 4 pages, vol. 105.

Levine et al., "Parallel Implementation of High-Fidelity Multiqubit Gates with Neutral Atoms," Physical Review Letters, 2019, 6 pages, vol. 123.

Loftus et al., "Magnetic trapping of ytterbium and the alkaline-earth metals," Physical Review, 2002, 5 pages, vol. 66.

Ma et al., "Delivering the same optical frequency at two places; accurate cancellation of phase noise introduced by an optical fiber or other time-varying path," Optic Letters, Nov. 1, 1994, pp. 1777-1779, vol. 19, No. 21.

Madjarov et al., "High-fidelity entanglement and detection of alkaline-earth Rydberg atoms," Nature Physics, Aug. 2020, pp. 857-862, vol. 16.

Madjarov et al., "An Atomic-Array Optical Clock with Single-Atom Readout," Physical Review, 2018, 14 pages, vol. 9.

Marciniak et al., "Optimal metrology with programmable quantum sensors," Nature, Mar. 24, 2022, pp. 604-611, vol. 603.

Mckeever et al., "Experimental realization of a one-atom laser in the regime of strong coupling," Letters to Nature, Sep. 18, 2003, pp. 268-271, vol. 425.

Menon et al., "Nanophotonic quantum network node with neutral atoms and an integrated telecom interface," New Journal of Physics, 2020, 12 pages, vol. 22.

Monz et al., "Realization of a scalable Shor algorithm," Quantum Computing, Science, Mar. 4, 2016, pp. 1068-1071, vol. 351, No. 6277.

Moses et al., "Creation of a low-entropy quantum gas of polar molecules in an optical lattice," Quantum Simulation, Science, Nov. 6, 2015, pp. 659-663, vol. 350.

Nguyen et al., "Operating a near-concentric cavity at the last stable resonance," Physical Review, 2018, 5 pages, vol. 98.

Norcia et al., Seconds-scale coherence on an optical clock transition in a tweezer array, Science, Oct. 4, 2019, pp. 93-97, vol. 366.

Norcia et al., Microscopic Control and Detection of Ultracold Strontium in Optical-Tweezer Arrays, Physical Review X, 2018, 14 pages, vol. 8.

Omran et al., "Generation and manipulation of Schrödinger cat states in Rydberg atom arrays," Science, Aug. 9, 2019, pp. 570-574, vol. 365.

Pedrozo-Peñafiel et al., "Entanglement on an optical atomic-clock transition," Nature, Dec. 17, 2020, pp. 414-420, vol. 588.

Pezzè et al., "Quantum metrology with nonclassical states of atomic ensembles," Reviews of Moden Physics, 70 pages, Jul.-Sep. 2018, vol. 90.

Pfaff et al., "Demonstration of entanglement-by-measurement of solid-state qubits," Nature Physics, Jan. 2013, 5 pages, vol. 9.

Pirandola et al., "Advances in quantum cryptography," Advances in Optics and Photonics, Dec. 2020, 225 pages, vol. 12, No. 4.

Pirandola et al., "Fundamental limits of repeaterless quantum communications," Nature Communications, 2017, 15 pages.

Polzik et al., "Entanglement and spin squeezing in a network of distant optical lattice clocks," Physical Review A, 2016, 5 pages, vol. 93.

Porsev et al., "Electric-dipole amplitudes, lifetimes, and polarizabilities of the low-lying levels of atomic ytterbium," Physical Review A, Oct. 1999, 5 pages, vol. 60, No. 4.

Reiserer, Andreas, "Cavity-based quantum networks with single atoms and optical photons," Reviews of Modern Physics, October-Dec. 2015, 40 pages, vol. 87.

Ritter et al., "An elementary quantum network of single atoms in optical cavities," Nature, Apr. 12, 2012, 7 pages, vol. 484.

Saffman et al., "Quantum information with Rydberg atoms," Review of Modern Physics, Jul.-Sep. 2010, 51 pages, vol. 82.

Samutpraphoot et al., "Strong Coupling of Two Individually Controlled Atoms via a Nanophotonic Cavity," Physical Review Letters, 2020, 6 pages, vol. 124.

Saskin et al., "Narrow-Line Cooling and Imaging of Ytterbium Atoms in an Optical Tweezer Array," Physical Review Letters, 2019, 6 pages, vol. 122.

Schymik et al., "Enhanced atom-by-atom assembly of arbitrary tweezer arrays," Physical Review A, 2020, 10 pages, vol. 102.

Sedlacek et al., "Electric Field Cancellation on Quartz by Rb Adsorbate-Induced Negative Electron Affinity," Physical Review Letters, PRL, 2016, 7 pages, vol. 116.

Sinclair et al., "Spectral Multiplexing for Scalable Quantum Photonics using an Atomic Frequency Comb Quantum Memory and Feed-Forward Control," Physical Review Letters, PRL, 2014, 5 pages, vol. 113.

Song et al., "Generation of multicomponent atomic Schrödinger cat states of up to 20 qubits," Science, Aug. 9, 2019, vol. 365.

Teller et al., "Heating of a Trapped Ion Induced by Dielectric Materials," Physical Review Letters, 2021, 6 pages, vol. 126.

Thiele et al., "Imaging electric fields in the vicinity of cryogenic surfaces using Rydberg atoms," Physical Review A, 2015, 6 pages, vol. 92.

Tiecke et al., "Nanophotonic quantum phase switch with a single atom," Nature, Apr. 10, 2014, 4 pages, vol. 508.

Uphoff et al., "An integrated quantum repeater at telecom wavelength with single atoms in optical fiber cavities," Applied Physics B, 2016, 15 pages, vol. 122, No. 46.

Wehner et al., "Quantum internet: A vision for the road ahead," Science, Oct. 19, 2018, 11 pages, vol. 362, No. 303.

Wengerowsky et al., "An entanglement-based wavelength-multiplexed quantum communication network," Nature, Dec. 13, 2018, 9 pages, vol. 564.

Wilson et al., "Trapping Alkaline Earth Rydberg Atoms Optical Tweezer Arrays," Physical Review Letters, 2022, 6 pages, vol. 128.

Ye et al., "Quantum State Engineering and Precision Metrology Using State-Insensitive Light Traps," Science, Jun. 27, 2008, pp. 1734-1739, vol. 320.

Young et al., "Half-minute-scale atomic coherence and high relative stability in a tweezer clock," Nature, Dec. 17, 2020, pp. 408-423, vol. 588.

Zhong et al., "Nanophotonic rare-earth quantum memory with optically controlled retrieval," Quantum Optics, Science, Sep. 29, 2017, pp. 1392-1395, vol. 357.

Albert et al., "Robust Encoding of a Qubit in a Molecule," Physical Review X, 2020, pp. 031050-1-031050-46.

Antypas et al., "Isotopic variation of parity violation in atomic ytterbium," Nature Physics, Feb. 2019, 6 pages, vol. 15.

Arute et al., "Quantum supremacy using a programmable superconducting processor," Nature, Oct. 24, 2019, pp. 505-510, vol. 574.

(56) References Cited

OTHER PUBLICATIONS

Barredo et al., "An atom-by-atom assembler of defect-free arbitrary two-dimensional atomic arrays," Science, Nov. 25, 2016, pp. 1021-1024, vol. 354, Issue 6315.

Barrett et al., "Efficient high-fidelity quantum computation using matter qubits and linear optics," Physical Review A, 2005, pp. 060310-1-060310-4, vol. 71.

Beloy et al., "Determination of the 5d6s 3D1 state lifetime and blackbody-radiation clock shift in Yb," Physical Review A, 2012, pp. 051404-1-051404-5, vol. 86.

Bennett et al., "Purification of Noisy Entanglement and Faithful Teleportation via Noisy Channels," Physical Review Letters, Jan. 29, 1996, pp. 772-725, vol. 76, No. 5.

Bernien et al., "Heralded entanglement between solid-state qubits separated by three metres," Nature, May 2, 2013, 5 pages, vol. 497, No. 87.

Bernien et al., "Probing many-body dynamics on a 51-atom quantum simulator," Nature, Nov. 30, 2017, 20 pages, vol. 551, No. 579.

Beugnon et al., "Two-dimensional transport and transfer of a single atomic qubit in optical tweezers," Nature Physics, Oct. 2007, pp. 696-699, vol. 3.

Birnbaum et al., "Photon blockade in an optical cavity with one trapped atom," Nature Letters, Jul. 7, 2005, pp. 87-90, vol. 436.

Boca et al., "Observation of the Vacuum Rabi Spectrum for One Trapped Atom," Physical Review Letters, PRL, 2004, pp. 233603-1-233603-4, vol. 93.

Bowers et al., "Experimental investigation of excited-state lifetimes in atomic ytterbium," Physical Review A, May 1996, pp. 3103-3109, vol. 53, No. 5.

Brekenfeld et al., "A quantum network node with crossed optical fibre cavities," Nature Physics, Jun. 2020, pp. 647-651, vol. 16.

Browaeys et al., "Many-body physics with individually controlled Rydberg atoms," Nature Physics, Feb. 2020, pp. 132-142, vol. 16.

Casabone et al., "Heralded Entanglement of Two Ions in an Optical Cavity," Physical Review Letters, PRL, 2013, pp. 100505-1-100505-5, vol. 111.

Cho et al., "Optical repumping of triplet-P states enhances magneto-optical trapping of ytterbium atoms," Physical Review A, 2012, pp. 035401-1-035401-4, vol. 85.

Choi et al., "Percolation-based architecture for cluster state creation using photon-mediated entanglement between atomic memories," NPJ, Quantum Information, 2019, 7 pages, vol. 5, No. 104.

Choi et al., "Emergent quantum randomness and benchmarking from Hamiltonian many-body dynamics," arXiv:2103.03535v2, Jul. 15, 2022, 25 pages.

Cirac et al., "Quantum State Transfer and Entanglement Distribution among Distant Nodes in a Quantum Network," Physical Review A, Apr. 21, 1997, pp. 3221-3224, vol. 78, No. 16.

Cooper et al., "Alkaline-Earth Atoms in Optical Tweezers," Physical Review X, 2018, pp. 041055-1-041055-19, vol. 8.

Covey et al., "Doublon dynamics and polar molecule production in an optical lattice," Nature Communications, Apr. 14, 2016, 8 pages.

Covey et al., "Microwave-to-optical conversion via four-wave mixing in a cold ytterbium ensemble," Physical Review A, 2019, pp. 012307-1-0112309-9, vol. 100.

Covey et al., "Telecom-Band Quantum Optics with Ytterbium Atoms and Silicon Nanophotonics," Physical Review Applied 2019, pp. 034044-1-034044-15, vol. 11.

Covey et al., "2000-Times Repeated Imaging of Strontium Atoms in Clock-Magic Tweezer Arrays," Physical Review Letters, 2019, pp. 173201-1-173201-6, vol. 122.

Daiss et al., "A quantum-logic gate between distant quantum-network modules," Science, 2021, pp. 614-617, vol. 371.

Davis et al., "Photon-Mediated Spin-Exchange Dynamics of Spin-1 Atoms," Physical Review Letters, pp. 010405-1-010405-6, vol. 122.

Deist et al., "Superresolution Microscopy of Optical Fields Using Tweezer-Trapped Single Atoms," 2022, pp. 083201-1-083201-6, vol. 128.

Đorđević et al., "Entanglement transport and a nanophotonic interface for atoms in optical tweezers," Science, 2021, pp. 1511-1514, vol. 373.

Duan et al., "Long-distance quantum communication with atomic ensembles and linear optics," Nature, Nov. 22, 2001, pp. 413-418, vol. 414.

Dür et al., "Entanglement Purification for Quantum Computation," Physical Review Letters, 2003, pp. 067901-1-067901-4, vol. 90, No. 6.

Dzuba et al., "Dynamic polarizabilities and related properties of clock states of the ytterbium atom," Journal of Physics B: Atomic, Molecular and Optical Physics, 2010, 8 pages, vol. 43.

Ebadi et al., "Quantum phases of matter on a 256-atom programmable quantum simulator," Nature, Jul. 8, 201, 19 pages, vol. 595.

Ender, David Adams, "Doubly-resonant two-photon-absorption-induced four-wave mixing in Tb(OH)3 and LiTbF4," Montana State University, Thesis, Aug. 1982, 122 pages.

Endres et al., "Atom-by-atom assembly of defect-free one-dimensional cold atom arrays," Science, Nov. 25, 2016, 5 pages, vol. 354, Issue 6315.

Erhard et al., "Entangling logical qubits with lattice surgery," Nature, Jan. 14, 2021, pp. 220-231, vol. 589.

Fowler et al., "Surface codes: Towards practical large-scale quantum computation," Physical Review A, 2012, pp. 032324-1-032324-48, vol. 86.

Gorshkov et al., "Alkaline-Earth-Metal Atoms as Few-Qubit Quantum Registers," Physical Review Letters, PRL, 2009, pp. 110503-1-110503-4, vol. 102.

Graham et al., "Hyperentanglement-Enabled Direct Characterization of Quantum Dynamics," Physical Review Letters, 2013, pp. 060404-1-060404-5, vol. 110.

Graham et al.,, "Rydberg-Mediated Entanglement in a Two-Dimensional Neutral Atom Qubit Array," Physical Review Letters, 2019, pp. 230501-1 to 230501-6, vol. 123.

Guo et al., "Dipole polarizabilities and magic wavelengths for a Sr and Yb atomic optical lattice clock," Journal of Physics B: Atomic, Molecular and Optical Physics, 2010, 8 pages, vol. 43.

Haas et al., "Entangled States of More Than 40 Atoms in an Optical Fiber Cavity," Science, Apr. 11, 2014, 5 pages, vol. 344.

Hensen et al., "Loophole-free Bell inequality violation using electron spins separated by 1.3 kilometres," Nature, Oct. 29, 2015, 5 pages, vol. 526.

Hofmann et al., "Heralded Entanglement Between Widely Separated Atoms," Science, Jul. 6, 2012, 5 pages, vol. 337.

Hucul et al., "Modular entanglement of atomic qubits using photons and phonons," Nature Physics, Jan. 2015, pp. 37-42, vol. 11.

Hunger et al., "A fiber Fabry-Perot cavity with high finese," New Journal of Physics, 2010, 24 pages, vol. 12.

Jiang et al., "Distributed quantum computation based on small quantum registers," Physical Review A, 2007, 22 pages, vol. 76.

Kalb et al., "Entanglement distillation between solid-state quantum network nodes," Science, 2017, pp. 928-932, vol. 356.

Kalb et al., "Heralded Storage of a Photonic Quantum Bit in a Single Atom," Physical Review Letters, PRL, 2014, 5 pages, vol. 114.

Kaneda et al., "Time-multiplexed heralded single-photon source," Optica, Optical Society of America, 2015, 4 pages, vol. 2, No. 12.

* cited by examiner

FROM FIG. 2B

Cooling and optical pumping     Qubit pulses     Atom-photon entanglement     Signal transmission

400

1100

| Step | Symbol | Description | Global? | Rate (kHz) |
|---|---|---|---|---|
| 1 | $\Gamma_{init}$ | Optical pumping and cooling | Global | 10 |
| 2 | $\Gamma_{\pi/2}$ | $\pi/2$ pulse | Global | 100 |
| 3 | $\Gamma_{FWM}$ | FWM protocol | One-by-one | 200/N |
| 4 | $\Gamma_{\pi}$ | $\pi$ pulse | Global | 50 |
| 5 | $\Gamma_{FWM}$ | FWM protocol | One-by-one (same order) | 200/N |
| 6 | $\Gamma_{comm}(L)$ | Heralded entanglement | Global (atom-unique time stamp) | $c/2L$ |

Figure 12:
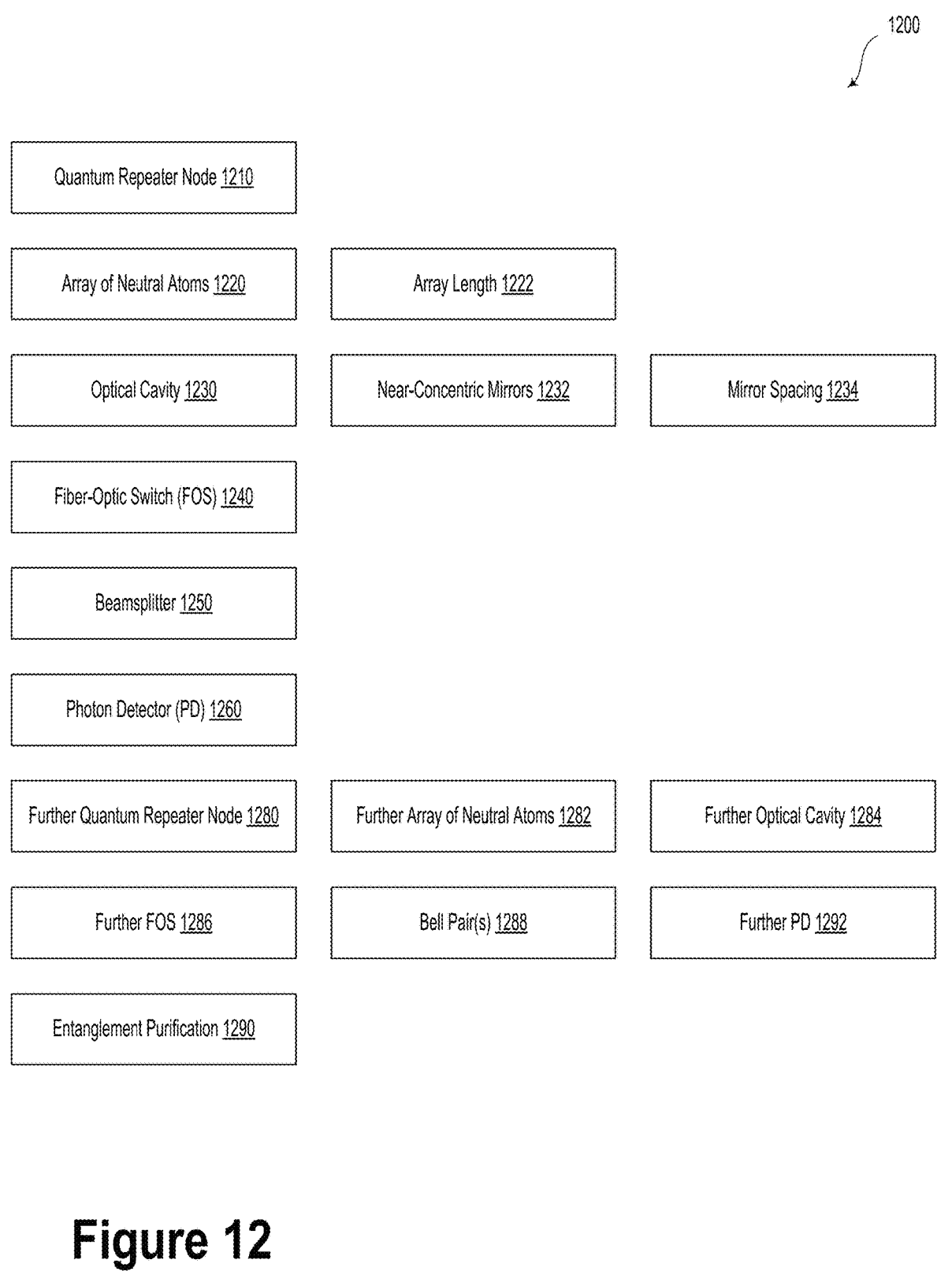

| Quantum Repeater Node 1210 | | |
|---|---|---|

| Array of Neutral Atoms 1220 | Array Length 1222 | |
|---|---|---|

| Optical Cavity 1230 | Near-Concentric Mirrors 1232 | Mirror Spacing 1234 |
|---|---|---|

| Fiber-Optic Switch (FOS) 1240 | | |
|---|---|---|

| Beamsplitter 1250 | | |
|---|---|---|

| Photon Detector (PD) 1260 | | |
|---|---|---|

| Further Quantum Repeater Node 1280 | Further Array of Neutral Atoms 1282 | Further Optical Cavity 1284 |
|---|---|---|

| Further FOS 1286 | Bell Pair(s) 1288 | Further PD 1292 |
|---|---|---|

| Entanglement Purification 1290 | | |
|---|---|---|

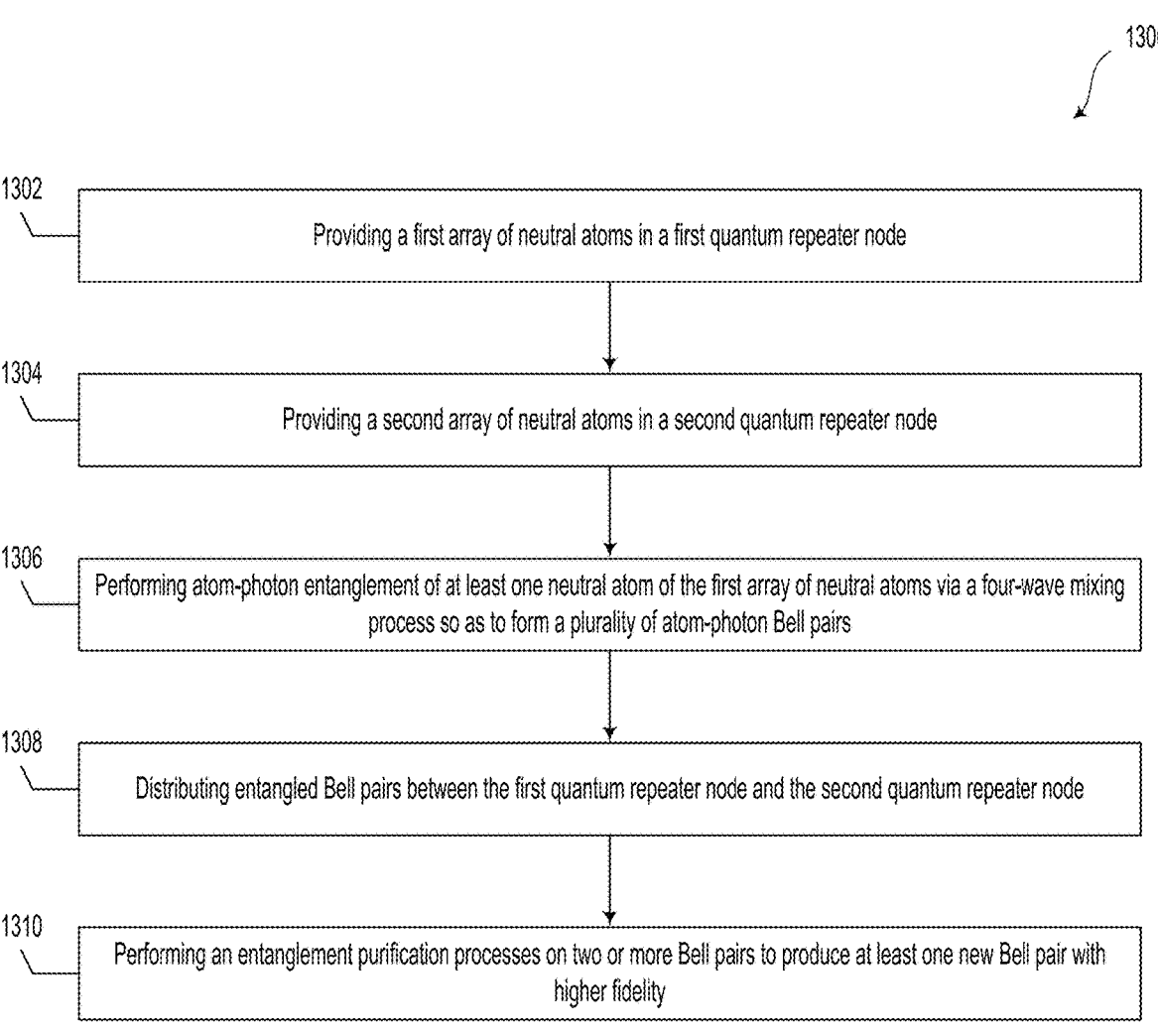

1302
Providing a first array of neutral atoms in a first quantum repeater node

1304
Providing a second array of neutral atoms in a second quantum repeater node 1306
Performing atom-photon entanglement of at least one neutral atom of the first array of neutral atoms via a four-wave mixing process so as to form a plurality of atom-photon Bell pairs 1308
Distributing entangled Bell pairs between the first quantum repeater node and the second quantum repeater node 1310
Performing an entanglement purification processes on two or more Bell pairs to produce at least one new Bell pair with higher fidelity

Figure 13

MULTIPLEXED TELECOMMUNICATION-BAND QUANTUM NETWORKING WITH ATOM ARRAYS IN OPTICAL CAVITIES

CROSS-REFERENCE TO RELATED APPLICATION

This application claims priority to and incorporates by reference the content of U.S. Provisional Pat. App. No. 63/359,699, filed Jul. 8, 2022.

GOVERNMENT LICENSE RIGHTS

This invention was made with government support under 2112663, 2137642 and 2016136 awarded by the National Science Foundation. The government has certain rights in the invention.

BACKGROUND

Despite recent work establishing neutral atom-based nodes for quantum communication networks, a major bottleneck for the development of such networks is the exponential attenuation and long transit time associated with sending single photons—the quantum bus that distributes entanglement—over long physical distances. Since the success probability per entanglement generation attempt is low and success must be "heralded" via two-way communication, there is intense interest in developing architectures that can "multiplex" many signals in parallel on each attempt. Multiplexing is necessary to construct networks much larger than the attenuation length in optical fiber (approximately 20 km in the telecommunication-band), but it is not sufficient. Intermediate "repeater" nodes are required to swap the entanglement and teleport quantum information. Additionally, entanglement "purification" protocols are often needed to improve the fidelity of the distributed quantum states.

Accordingly, there is a need for improved systems and methods that enable more reliable, longer-distance quantum communications and networking.

SUMMARY

Embodiments of the present disclosure include systems and methods for interfacing quantum processors comprising neutral atom arrays with telecommunication-band photons in a multiplexed network architecture. In certain embodiments, the use of a large atom array instead of a single atom mitigates the deleterious effects of two-way communication and improves the entanglement rate between two nodes by nearly two orders of magnitude. Certain embodiments simultaneously provide the ability to perform high-fidelity deterministic gates and readout within each node, opening the door to quantum repeater and purification protocols to enhance the length and fidelity of the network, respectively. In some embodiments, the use of intermediate nodes as quantum repeaters demonstrates the feasibility of entanglement distribution over approximately 1500 km based on realistic assumptions, providing a blueprint for a transcontinental network. Various embodiments include a platform, systems and methods that can distribute roughly 35 Bell pairs over metropolitan distances, which could serve as the backbone of a distributed fault-tolerant quantum computer.

Exemplary implementations and embodiments include long-distance quantum networking, quantum key distribution, fault-tolerant distributed quantum computing (metro-politan scale), an optical atomic clock network, and modular quantum computing architectures.

In a first aspect, a quantum networking system is provided. The system includes at least one quantum repeater node. The quantum repeater node includes an array of neutral atoms disposed in an optical cavity. The quantum repeater node also includes a fiber-optic switch (FOS). The FOS is optically coupled to the optical cavity. The system also includes at least one beamsplitter that is optically coupled to the FOS.

In a second aspect, a quantum networking method is provided. The method includes providing a first array of neutral atoms in a first quantum repeater node and providing a second array of neutral atoms in a second quantum repeater node. The method also includes performing atom-photon entanglement of at least one neutral atom of the first array of neutral atoms via a four-wave mixing process so as to form a plurality of atom-photon Bell pairs. The method additionally includes distributing entangled Bell pairs between the first quantum repeater node and the second quantum repeater node. The method yet further includes performing an entanglement purification processes on two or more Bell pairs to produce at least one new Bell pair with higher fidelity.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

3

Figure 6A:

FIG. 6A illustrates multiple Bell pairs at the network and single link levels, according to an example embodiment.

Figure 6B:
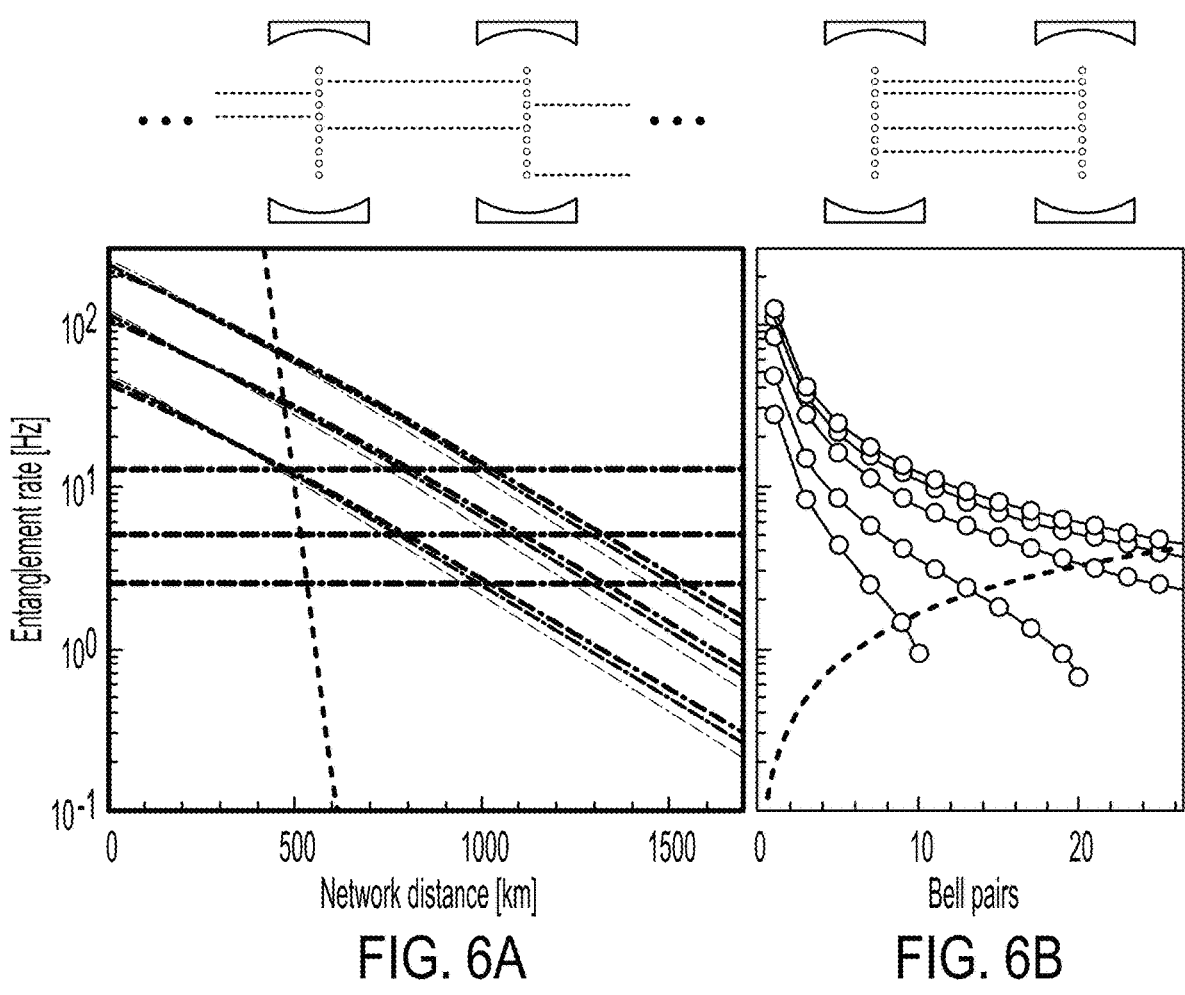

FIG. 6B illustrates multiple Bell pairs at the network and single link levels, according to an example embodiment.

Figure 7A:
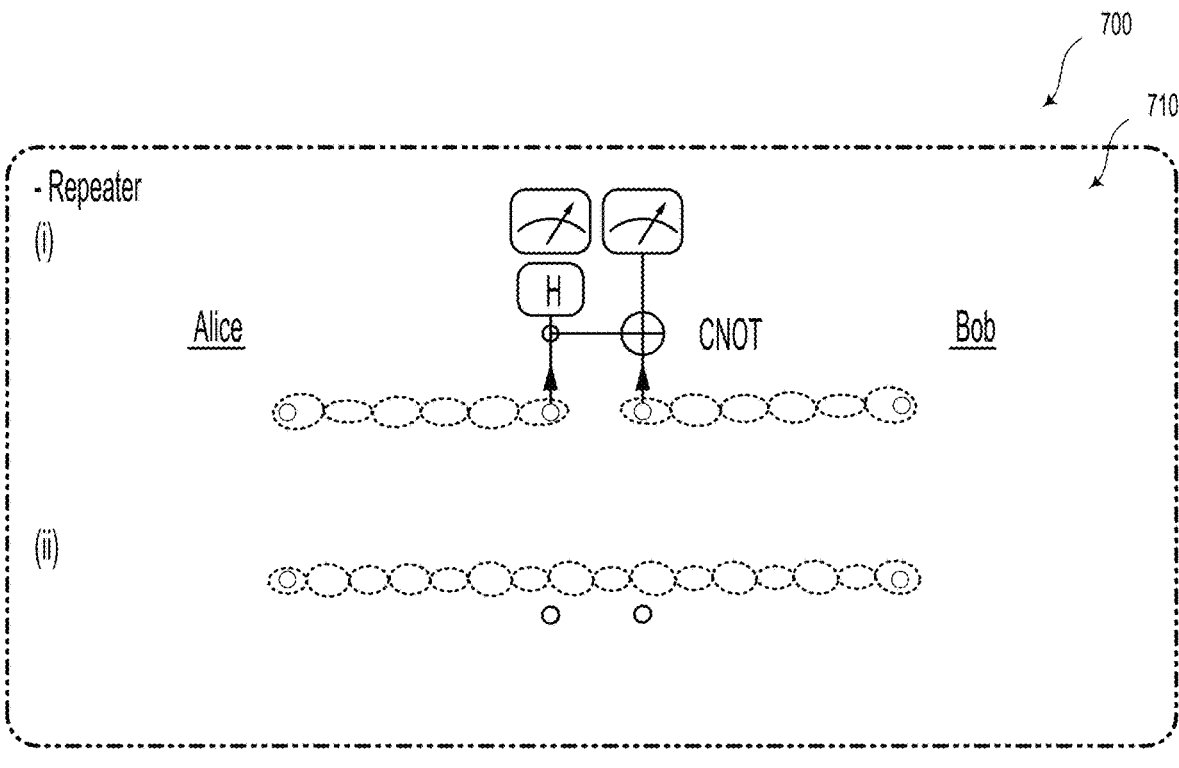

FIG. 7A illustrates a schematic overview of quantum repeater and purification protocols, according to an example embodiment.

Figure 7B:
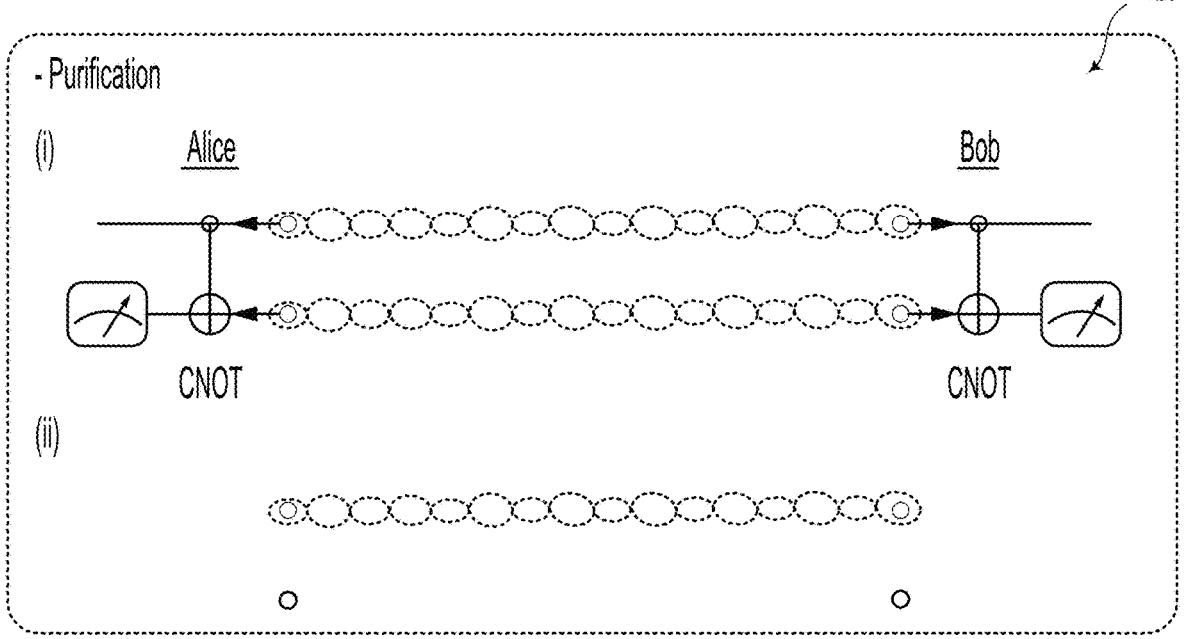

FIG. 7B illustrates a schematic overview of quantum repeater and purification protocols, according to an example embodiment.

Figure 8:
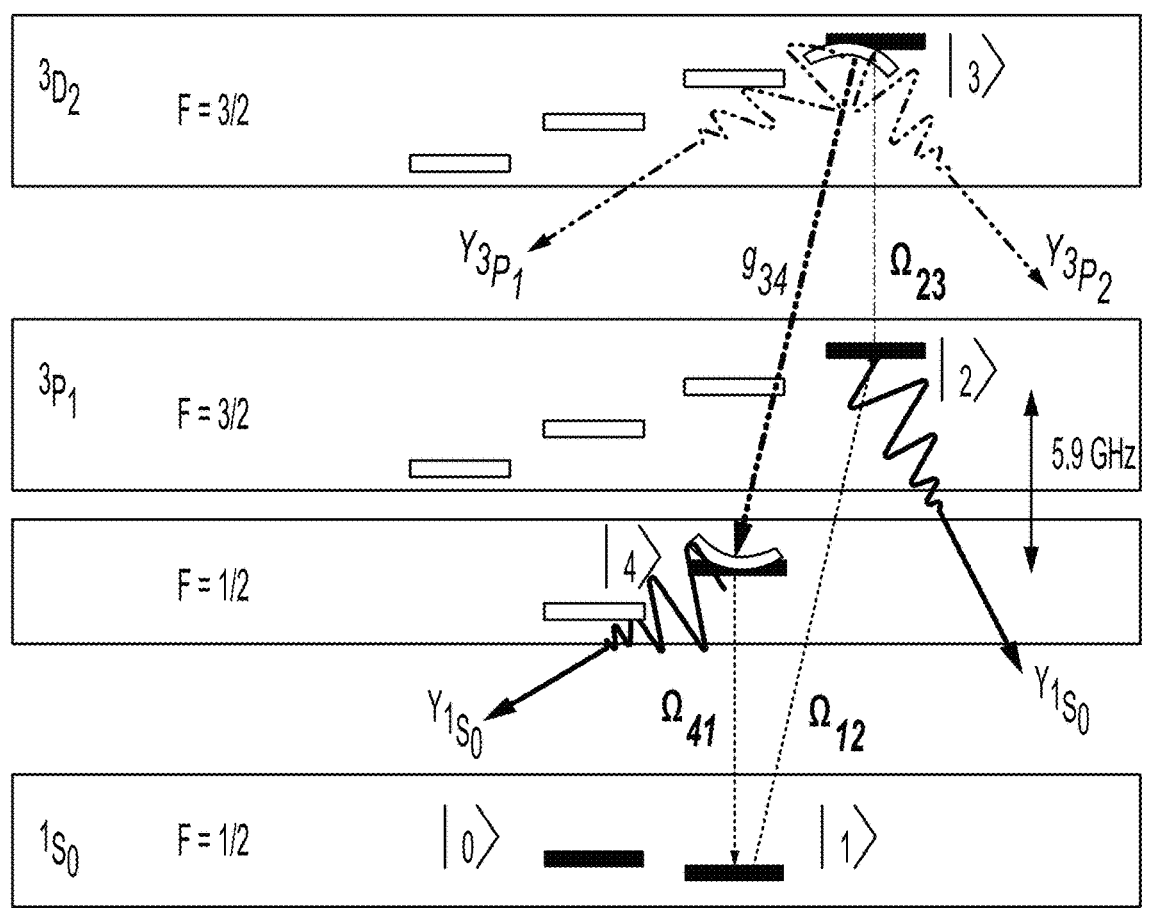

FIG. 8 illustrates relevant levels of four-wave mixing, according to an example embodiment.

Figures 9A, 9B:
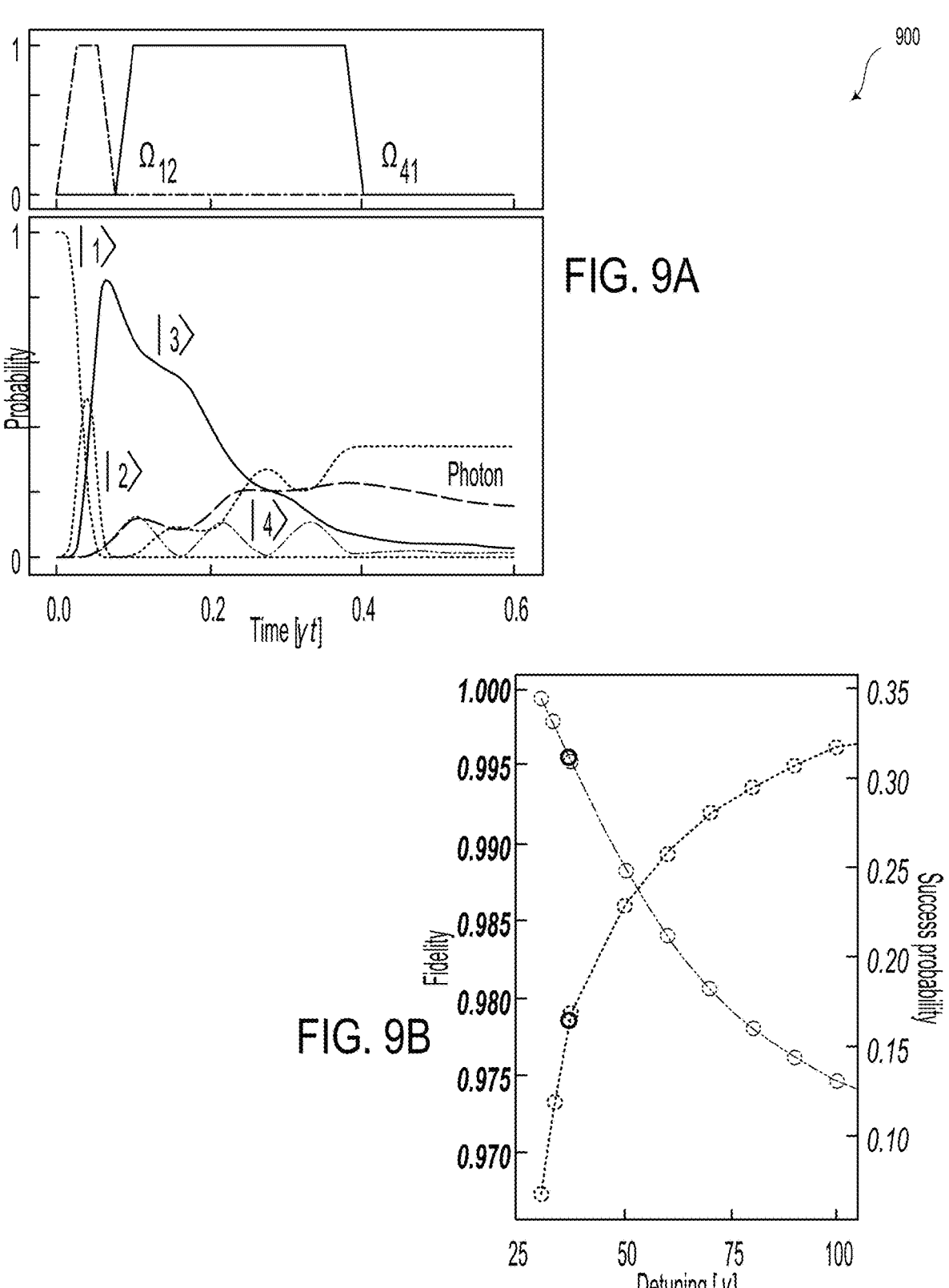

FIG. 9A illustrates a detuned four-wave mixing scheme, according to an example embodiment.

FIG. 9B illustrates a detuned four-wave mixing scheme, according to an example embodiment.

Figure 10:
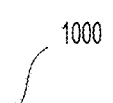
Figure 10:
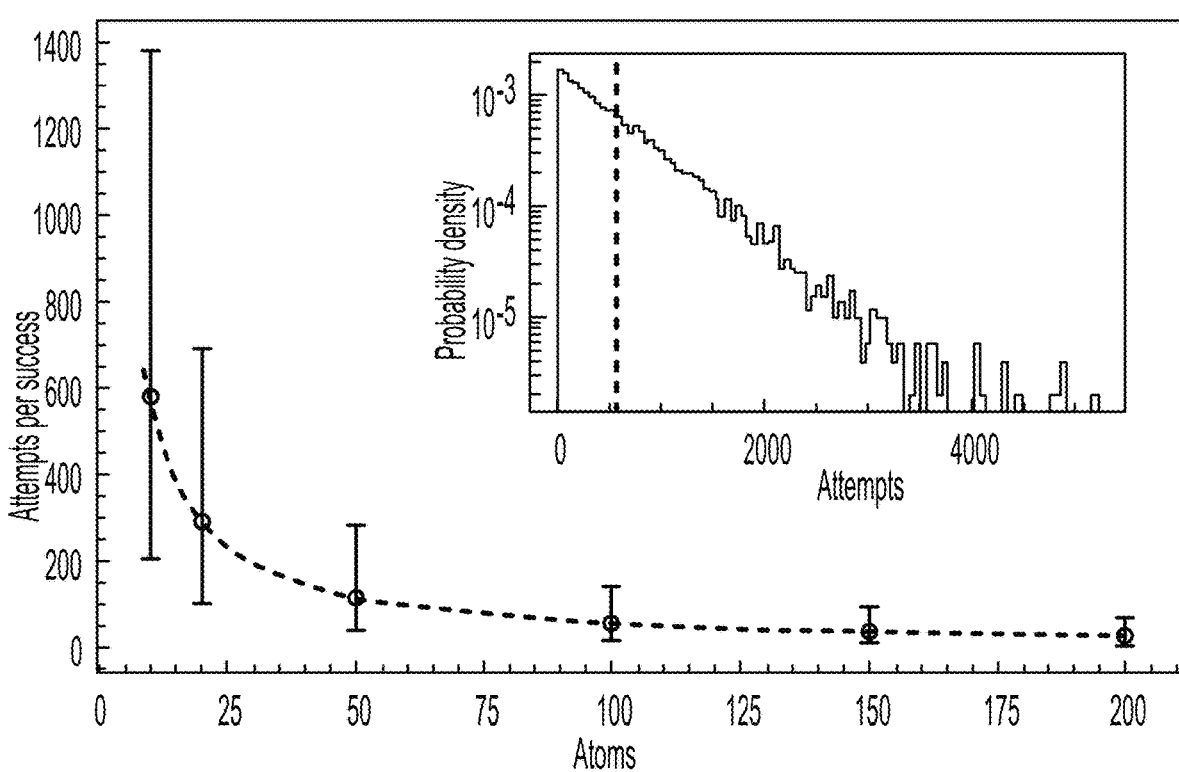

FIG. 10 illustrates a simulation of the mean number of attempts to form a Bell pair across a single link, according to an example embodiment.

FIG. 11 illustrates a table showing rates for constituent steps in the single-link multiplexing protocol, according to an example embodiment.

FIG. 12 illustrates a quantum networking system, according to an example embodiment.

FIG. 13 illustrates a method, according to an example embodiment.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

It should be understood that the below embodiments, and other embodiments described herein, are provided for explanatory purposes, and are not intended to be limiting.

I. OVERVIEW

The realization of a quantum network node of matter-based qubits compatible with telecom-band operation and large-scale quantum information processing is an outstanding challenge that has limited the potential of elementary quantum networks. The present disclosure describes a platform for interfacing quantum processors comprising neutral atom arrays with telecom-band photons in a multiplexed network architecture. The use of a large atom array instead of a single atom mitigates the deleterious effects of two-way communication and improves the entanglement rate between two nodes by nearly two orders of magnitude. Further, this system simultaneously provides the ability to perform high-fidelity deterministic gates and readout within each node, opening the door to quantum repeater and purification protocols to enhance the length and fidelity of the network, respectively. Using intermediate nodes as quantum repeaters, the present disclosure describes entanglement distribution over ≈1500 km based on realistic assumptions, providing a blueprint for a transcontinental network. As an example, the described system can distribute ≳25 Bell pairs over metropolitan distances, which could serve as the backbone of a distributed fault-tolerant quantum computer.

The development of a robust quantum network will usher in an era of cryptographically-secured communication, distributed and blind quantum computing, and sensor and clock networks operating with precision at the fundamental limit. Almost all of these applications require network nodes that are capable of storing, processing, and distributing quantum information and entanglement over large distances. Nodes based on neutral atoms have the potential to combine highly desirable features including minute-scale coherence and memory times, scalability to hundreds of qubits per node, multi-qubit processing capabilities, and efficient light-matter interfaces at telecom wavelengths based on optical cavities.

A major bottleneck for the development of such a network is the exponential attenuation and long transit time associated with sending single photons—the quantum bus that distributes entanglement—throughout the network. Since the success probability per entanglement generation attempt is low and success must be "heralded" via two-way communication, there is intense interest in developing architectures that can "multiplex" many signals in parallel on each attempt. Multiplexing is necessary to construct networks much larger than the attenuation length in optical fiber (≈20 km in the telecom band), but it not sufficient. Intermediate "repeater" nodes are required to swap the entanglement and teleport quantum information. Additionally, entanglement "purification" protocols are often needed to improve the fidelity of the distributed quantum states.

The present disclosure describes a quantum network and repeater node architecture that is capable of high-rate, multiplexed entanglement generation, deterministic inter-node quantum gates and Bell-state measurements for purification and distribution of many-body states, while at the same time operating at telecom wavelengths where low-loss optical fibers permit long-distance entanglement distribution. Various embodiments are based on arrays of individual neutral ytterbium (Yb) atoms, an alkaline earthlike species, in large (≈1 cm), near-concentric optical cavities. In some examples, a time-bin entanglement generation protocol is utilized that combines a strong, 1.48 μm-wavelength transition and long-lived nuclear spin-½ qubit states of $^{171}$Yb with temporal multiplexing along the array of atoms.

Figures 1A, 1B, 1C, 1D:
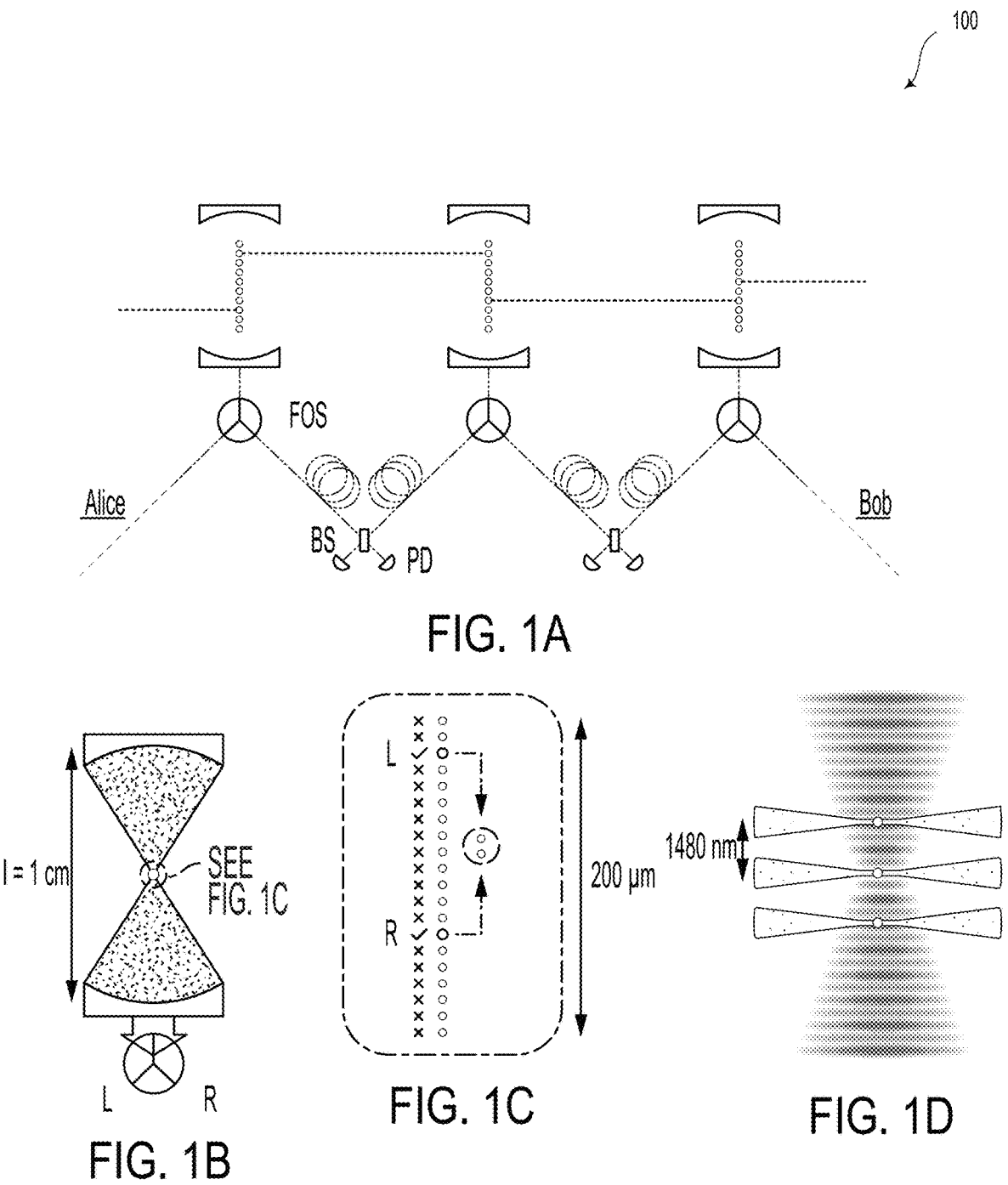
FIG. 1A illustrates an overview of the quantum network architecture, according to an example embodiment.
FIG. 1B illustrates an overview of the quantum network architecture, according to an example embodiment.
FIG. 1C illustrates an overview of the quantum network architecture, according to an example embodiment.
FIG. 1D illustrates an overview of the quantum network architecture, according to an example embodiment.

FIGS. 1A, 1B, 1C, and 1D illustrate an overview of the quantum network architecture 100, according to an example embodiment. FIG. 1A illustrates nodes based on arrays of atoms (stacked circles) in optical cavities generate a Bell pair over each link (horizontal dashes) to distribute entanglement between end-users Alice and Bob. Example embodiments involve "heralded" entanglement generation based on photon interference on a 50:50 beamsplitter (BS). Fiber-optic switches (FOS) connect adjacent nodes at will by routing the photons from each cavity. FIG. 1B illustrates the near-concentric optical cavities, which have a mirror spacing of ≈1 cm while the atom array spans a length of only ≈200 μm. FIG. 1C illustrates the time signature of the photons on the detectors (PD). The time signature informs which atoms at each node are in a Bell state (check marks). Subsequent, deterministic gates can be achieved by moving these atoms (dashed arrows) and performing Rydberg entangling operations. FIG. 1D illustrates a standing wave in the cavity traps atoms in a one-dimensional array to overlap with the highest field strength of the telecom mode. Atoms are positioned with auxiliary optical tweezers that also move the atoms.

Based on recent progress with alkaline-earth atomic arrays and realistic assumptions regarding the operation of these nodes, the described multiplexing protocol can generate Bell pairs over >1000 kilometers within the coherence time of the qubits, and is compatible with entanglement purification protocols as well as the distribution of many-body states. Presently described embodiments could be utilized to form a versatile metropolitan or transcontinental network through an architecture that combines the use of Rydberg atom arrays, cavity QED with strong atom-photon coupling, and atom-array optical clocks in a single platform.

An overview of the presently described multiplexed time-bin networking protocol follows. Specifically, consider the example of a network link of length L=100 km. The associated two-way signal transmission time per attempt is $\tau=2L/c$, where $c=c_0/n$ is the speed of light in optical fiber (n=1.4) that includes both the quantum signal and classical heralding signal; $\tau=1$ ms for this distance. Based on methods described herein, $\approx5800$ entanglement attempts may be needed if there is only a single qubit (atom) at each node, resulting in a $\approx0.16$ Hz entanglement generation rate.

Figure 2A:
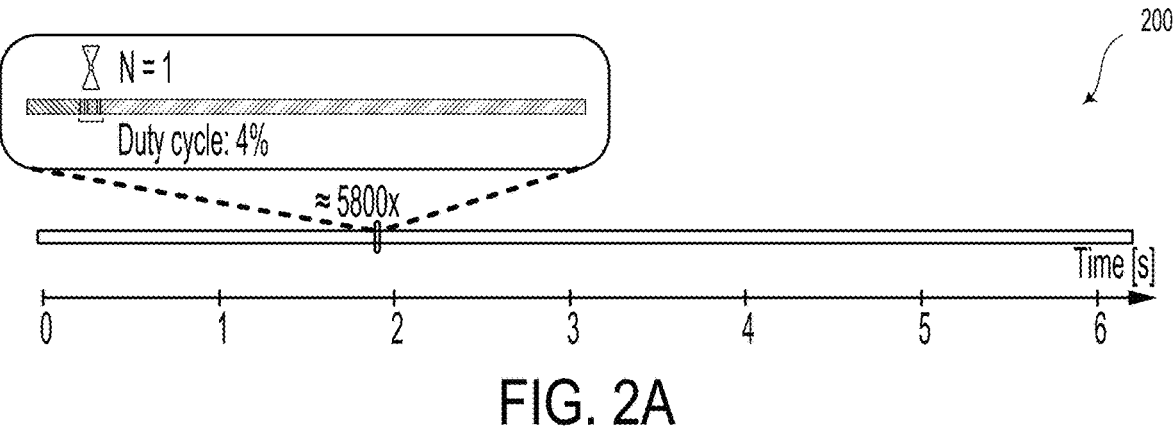
FIG. 2A illustrates multiplexed remote entanglement generation, according to an example embodiment.
Figure 2B:
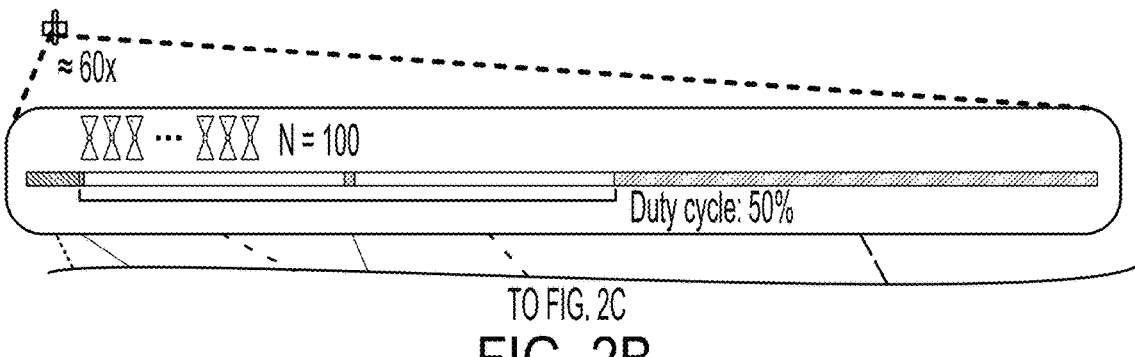
FIG. 2B illustrates multiplexed remote entanglement generation, according to an example embodiment.
Figure 2C:
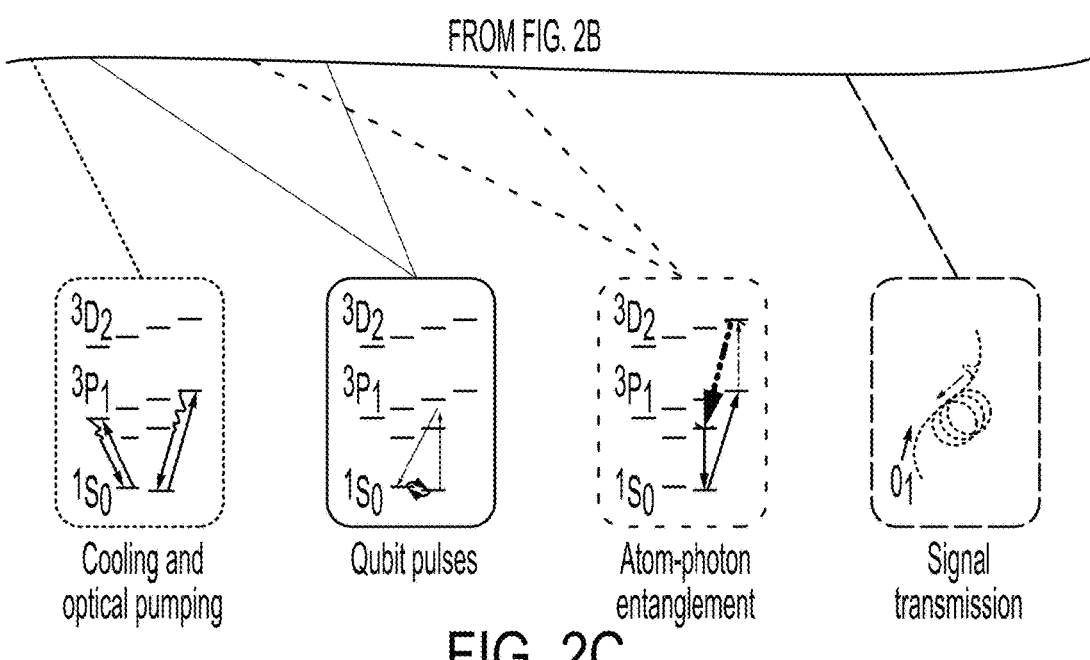
FIG. 2C illustrates multiplexed remote entanglement generation, according to an example embodiment.

FIGS. 2A, 2B, and 2C illustrate multiplexed remote entanglement generation 200, according to an example embodiment. FIG. 2A illustrates that with only a single atom at each node, the low success probability necessitates an average of $\approx5800$ entanglement attempts. The solid bar shows this process with time moving to the right. The zoom shows a single attempt, in which the cooling and initialization of the atom (left-most portion of bar) and signal transmission over the link (right-most portion of bar) dominate the duration of each attempt. The duty cycle (fraction of time) of entanglement-producing operations—qubit rotations (bracketed portion of bar) and atom-photon entanglement—is only $\approx4\%$. FIG. 2B illustrates that with an array of N=100 atoms at each node, the success probability necessitates an average of only $\approx60$ multiplexed attempts; hence the overall time it takes to create entanglement (overall length of bar) is much shorter. In some embodiments, each attempt takes longer and has a much greater duty cycle of $\approx50\%$ for entanglement-producing operations.

In other words, FIGS. 2A and 2B show the full process of successful entanglement generation with a zoomed view of each attempt. For N=1, the attempt time is dominated by signal transmission (full timing details are described below) such that the duty cycle (fraction of time) of entanglement-producing operations is only $\approx4\%$. If instead each node includes N=100 qubits and their signals are multiplexed as described below, the number of required attempts can be decreased to only $\approx60$ resulting in a $\approx50$-fold increase in the entanglement rate to 8 Hz at L=100 km. In such scenarios, the duty cycle for entanglement-producing entanglement producing operations is much higher $\approx50\%$.

Although the time required per attempt is longer when multiplexing across a large number of atoms (e.g., N=100), the favorable scaling in success probability per attempt over long network links leads to substantially improved entanglement generation rates compared to the case of a single atom.

FIG. 2C illustrates the operations required for each entanglement attempt. The two qubit rotations and atom-photon entanglement operations follow a standard protocol for time-bin entanglement generation.

A description of the network architecture follows. Namely, an overview of the atom array platform and the atom-photon entanglement scheme is provided.

Coupling neutral atoms to optical cavities with small mode volumes such as nanophotonic and fiber-gap Fabry-Perot systems can beneficially enhance atom-photon coupling. However, these types of systems are not readily compatible with large atom arrays (and single-atom control therein) due to their limited optical accessibility. Additionally, the proximity of dielectric surfaces to the atoms makes the prospect for robust, high-fidelity Rydberg-mediated gates uncertain as stray electric fields limit the coherence of Rydberg transitions.

Meanwhile, near-concentric cavities with large mirror spacings ($\ell\gtrsim1$ cm) have recently been used with great success in myriad cavity QED research directions, and offer enough optical access to enable single-atom control in cavity-coupled atom arrays. In some embodiments, the mirror spacing is similar to the size of glass cells used in many recent high-fidelity Rydberg entanglement studies. Further, near-concentric cavities are widely used in trapped ion systems that are also sensitive to transient electric fields from dielectric surfaces. Therefore it is reasonable to expect that these cavities are compatible with deterministic Rydberg-mediated gates and Bell state measurements needed in a quantum repeater and purification architecture.

Example embodiments include a near-concentric system with a $\ell=0.975$ cm and radius of curvature R=5 mm for which the cavity stability parameter $G=1-\ell/R=-0.95$. (G=−1 defines the concentric limit which is unstable.) Some examples include a single-sided cavity, where the reflectivity of one mirror is much greater than the other to allow photon passage, with a finesse of 50,000. In some embodiments, the cavity is coupled to the $^3P_1\leftrightarrow{}^3D_2$ transition with wavelength $\lambda_{net}=1480$ nm and decay rate $\Gamma=2\pi\times318$ kHz. Based on these parameters, the coupling strength to the cavity is $g_{34}\approx2\pi\times1.53$ MHz and the single-atom cooperativity is $C\approx16$.

In various examples, the atoms are trapped in a standing wave at $\lambda_{trap}=\lambda_{net}/2=740$ nm to ensure maximal coupling with the telecom field (at $\lambda_{net}$) in the cavity (see FIG. 1D). The standing wave at $\lambda_{trap}$ is fortuitously close to the 'magic' wavelength for the optical clock transition ($^1S_0\leftrightarrow{}^3P_0$) where the two states have equal polarizability: $\lambda_m=760$ nm. The expected $1/e^2$ waist radius for this standing wave is $w_{trap}\approx14$ μm; the trap depth (and frequency) are free parameters. Optical tweezers are employed to create an atom array from the magneto-optical trap (MOT) before the standing wave is turned on, and the tweezers are positioned to overlap the desired anti-nodes of the standing wave (see FIG. 1D). The standing wave provides strong axial confinement with $\lambda_{trap}/2$ spacing between the anti-nodes and guaranteed maximal overlap with the anti-nodes of telecom cavity mode at $\lambda_{net}$, and the tweezers provide strong transverse confinement.

Figures 3A, 3B, 3C, 3D:
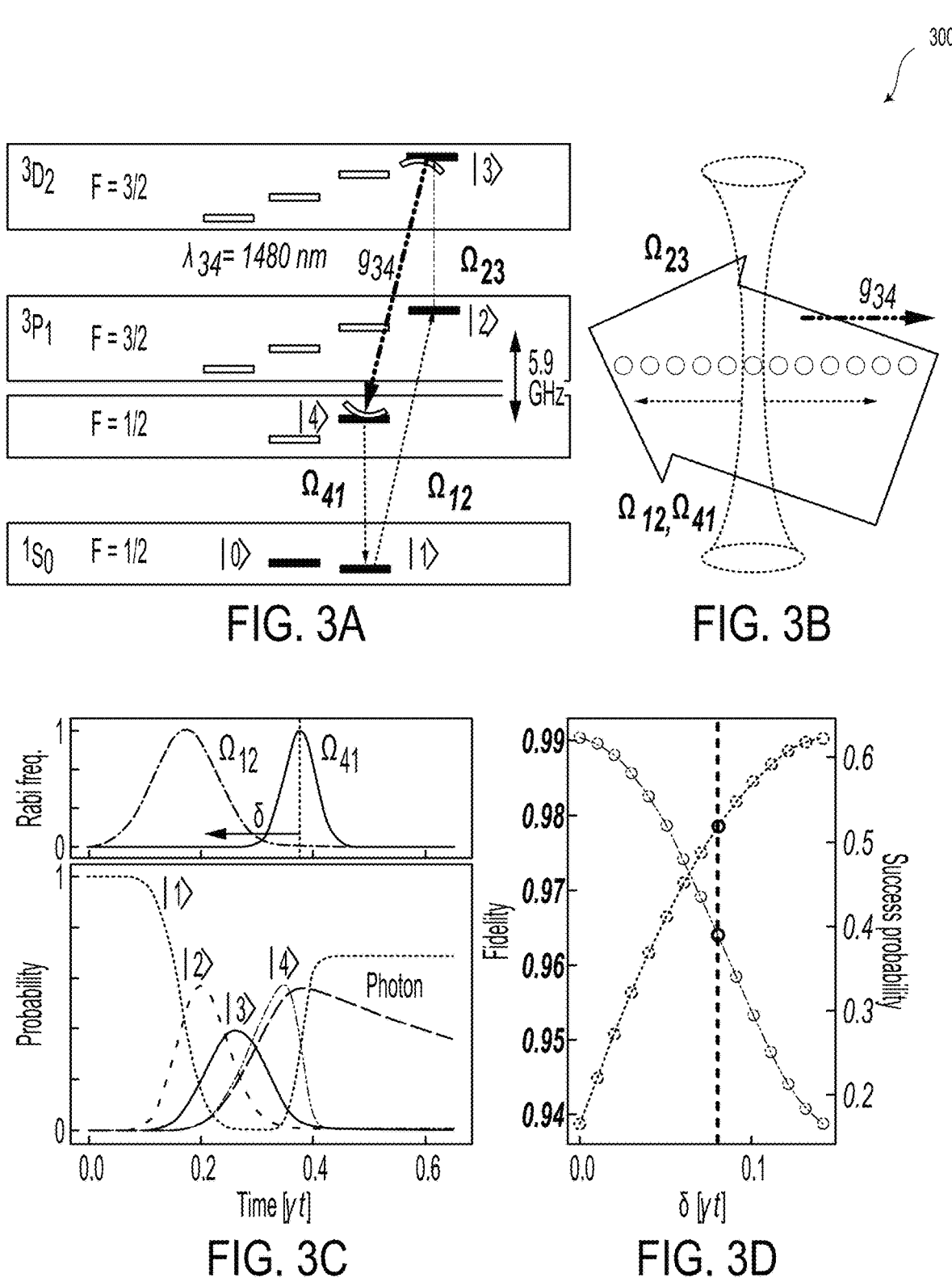
FIG. 3A illustrates a four-pulse excitation scheme for multiplexed remote entanglement, according to an example embodiment.
FIG. 3B illustrates a four-pulse excitation scheme for multiplexed remote entanglement, according to an example embodiment.
FIG. 3C illustrates a four-pulse excitation scheme for multiplexed remote entanglement, according to an example embodiment.
FIG. 3D illustrates a four-pulse excitation scheme for multiplexed remote entanglement, according to an example embodiment.

FIGS. 3A, 3B, 3C, and 3D illustrate a four-pulse excitation scheme 300 for multiplexed remote entanglement, according to an example embodiment. FIG. 3A is a minimal diagram of the $^{171}$Yb level structure showing two hyperfine Zeeman states in the $^3P_1$ manifold as intermediaries. FIG. 3B illustrates local application of $\Omega_{12}$ and $\Omega_{41}$ on an atom-by-atom level is the primary mechanism for the time-based multiplexing scheme. FIG. 3C illustrates an analysis of the pulses and internal dynamics during the process as well as the temporal shape of the extracted photon that is entangled with the nuclear qubit in the ground state. The arrow highlights that the relative timing of the two pulses $\Omega_{12}$ and $\Omega_{41}$ is a free parameter. The maximum Rabi frequencies of these pulses are $$\{\Omega_{12}^{max}, \Omega_{34}^{max}\} = \{13.2\gamma, 23.0\gamma\} \text{ and } \gamma = 2\pi\times180 \text{ kHz}$$

is the decay rate of $^3P_1$. FIG. 3D illustrates the resulting atom-photon entanglement fidelity and success probability vs the relative timing $\delta$ of $\Omega_{12}$ and $\Omega_{41}$ in units of $\gamma$. (FIG. 3C corresponds to $\delta=0$.) Some example embodiments include $\delta$ as shown in the black dashed line.

In various example embodiments, the atom-photon entanglement is provided via a four-wave mixing scheme. Namely, in some examples, the nuclear spin-½ qubit in the ground state of $^{171}Yb$ is entangled with a 1480 nm-photon on the $^3P_1 \leftrightarrow {}^3D_2$ transition via a four-pulse scheme that uses two Zeeman states within the 3P1 manifold as intermediaries as illustrated in FIG. 3A. The target state is the atom-photon Bell state $|\psi\rangle_{atom\text{-}photon}=(|0\rangle_a|early\rangle_p+|1\rangle_a|late\rangle_p)/\sqrt{2}$, in which the atomic qubit states $\{|0\rangle_a, |1\rangle_a\}$ are entangled with the photon occupation in an early and late emission time bin $\{|early\rangle_p, |late\rangle_p\}$. Such time-bin encoded states are suited for long-distance entanglement distribution via optical fibers as they are robust against birefringence in fibers that would adversely affect other encodings such as polarization encoded states. To create $|\psi\rangle|_{atom\text{-}photon}$, a superposition of the atomic qubit states $(|0\rangle_a+|1\rangle_a)/\sqrt{2}$ is prepared. Then a coherent atomic pulse sequence results in the emission of a photon into the cavity mode only if the atom is in $|1\rangle$. The proposed four-level system that allows such a state selective emission is shown in FIG. 3A, and was inspired by similar sequences that have recently been considered for alkali species. After the emission in the early time bin, a $\pi$-pulse on the qubit states flips $|0\rangle_a$ and $|1\rangle_a$, and a second optical pulse sequence causes emission in the late time bin. This completes the protocol and leaves the system in the target state $|\psi\rangle_{atom\text{-}photon}$.

The F=3/2 and F=1/2 hyperfine structure of the $^3P_1$ manifold is leveraged to provide the well-separated intermediate states $|2\rangle$ and $|4\rangle$, and a magnetic field of $B\gtrsim100$ G is provided, although this is not strictly necessary. Note that a $\lesssim10^{-4}$-level field homogeneity across the array is expected, corresponding to ~10 kHz-level shifts of the telecom transition. These shifts are the ‰ level of the photon bandwidth, and are mitigated by pairing atoms in identical locations within their respective arrays, thus experiencing similar local environments. Gaussian pulses $\Omega_{12}$ and $\Omega_{41}$ are applied on a per-atom basis within the array (FIG. 3C) as the primary mechanism for the time-based multiplexing scheme. $\Omega_{23}$ and $\Omega_{34}$ couple to all atoms globally, but are distantly off-resonant with negligible differential effect on the qubit $|0\rangle$-$|1\rangle$ when $\Omega_{12}$ and $\Omega_{41}$ are not applied to the atom. Hence, the tightly-focused $\Omega_{12}$ and $\Omega_{41}$ beams are rastered across the atoms such that the position of the atom in the array is mapped to the time-stamp of the photon emitted into the cavity.

The optimization and analysis of the pulse design is described elsewhere herein and summarized FIG. 3C. $\Omega_{23}$ remains at a constant value for the entire duration of the four-wave mixing (FWM) protocol. Then, population is transferred from $|1\rangle$ to $|2\rangle$ with $\Omega_{12}$. These two fields populate $|3\rangle$, which is transferred to $|4\rangle$ by the coherent cavity coupling $g_{34}$. Note that other schemes for transferring population from $|1\rangle$ to $|3\rangle$, such as a two-photon $\pi$-pulse detuned from the intermediate state $|2\rangle$, are expected to further suppress double-excitation due to decay during the first half of the FWM protocol to below 1%. We then perform $\Omega_{41}$ to coherently transfer the atomic population back to $|1\rangle$. The relative timing of the $\Omega_{12}$ and $\Omega_{41}$ pulses introduces a trade-off between process fidelity and success probability (FIG. 3D). Essentially, the process is limited by spontaneous emission from $|4\rangle$ which occurs at a rate $\Gamma_{41}=2\pi\times180$ kHz$\approx g_{34}/8.5$. Moving the $\Omega_{41}$ pulse earlier mitigates the decay but reduces the probability of success. Note that the remote entanglement scheme is heralded, so events that do not produce photons only affect success rates, while events that produce photons but leave the atom in the wrong state are classified as successful and lead to infidelity. The values shown in FIG. 3D for which the fidelity (success probability) of producing $|\psi\rangle_{atom\text{-}photon}$ with the photon in the fiber is $\approx0.98$ ($\approx0.39$). It is assumed that the atom-atom Bell state fidelities of $F_{atom\text{-}photon}\gtrsim0.90$.

Figure 4:
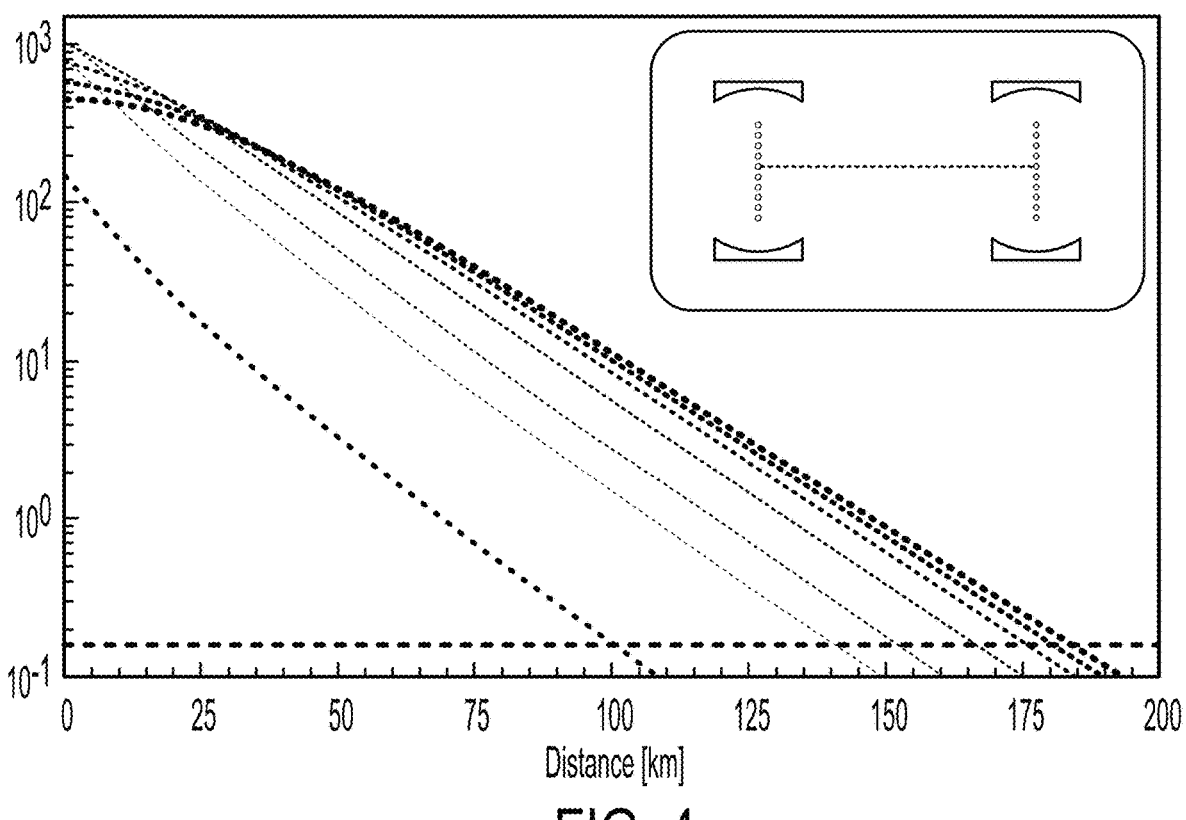
FIG. 4 illustrates an entanglement rate versus distance for a single link, according to an example embodiment.

The entanglement distribution rates are described by considering a single link between two nodes. Details of the analysis are described elsewhere herein. FIG. 4 shows the mean entanglement rate in a multiplexed scheme versus the distance between the nodes for different atom numbers N. For distances larger than $\approx20$ km, a large improvement of the entanglement rate is observed as more atoms per node are used. At a distance of 100 km, a $\approx50$-fold faster rate is observed when using 100 atoms per node as compared to the single-atom case. In some embodiments, the entanglement rate sees diminishing returns for $N\gtrsim200$ due to two main factors. First, the probability of successfully creating a Bell pair asymptotically saturates at 1 such that larger numbers of atoms are not needed for suitably large rates. Second, the time per entanglement attempt becomes dominated by the total time required to perform the four-wave-mixing protocol for all the atoms at each node, rather than the classical signal transmission time between them (see FIG. 2A). This second effect is clearly visible at short distances below $\approx25$ km.

In some examples, the entanglement rate may be compared to the coherence time of the qubits in the nodes. A conservative lower bound of $T_2=1$ s is assumed for nuclear qubits, but note that it could approach the minute scale in some examples. Hence, distribution rates above $\delta_{coherence}=1/(2\pi T_2)=0.16$ Hz to have a sufficiently high link efficiency for useful entanglement. This criterion suggests that the example platform described herein will enable the generation of entanglement over $\approx180$ km using N=200 atoms.

FIG. 4 illustrates an entanglement rate 400 versus distance for a single link, according to an example embodiment. FIG. 4 describes multiplexed entanglement generation between two nodes, each containing an array of atoms in an optical cavity. The mean entanglement distribution rate versus the length of the link is provided for various numbers of atoms N is shown as an opacity scale for N=$\{10, 20, 50, 100, 150, 200\}$ with N=200 being fully opaque. This scale is used in subsequent figures. The dotted line shows the entanglement distribution rate for N=1. The horizontal dashed line shows a conservative estimate for the anticipated decoherence rate of the atoms. As illustrated in the inset, the rates provided are those associated with successfully generating a single Bell pair with one atom at each node.

In some example embodiments, intermediate repeater nodes are utilized to extend the range of entanglement generation to greater distances. In various examples, these intermediate links form a larger chain which we refer to as the "network-level" architecture. The length L between end-users Alice and Bob is broken into $2^m$ segments with length $L_m=L2^m$, where m is a non-negative integer can be termed the "nesting level" of the network.

Figures 5A, 5B:
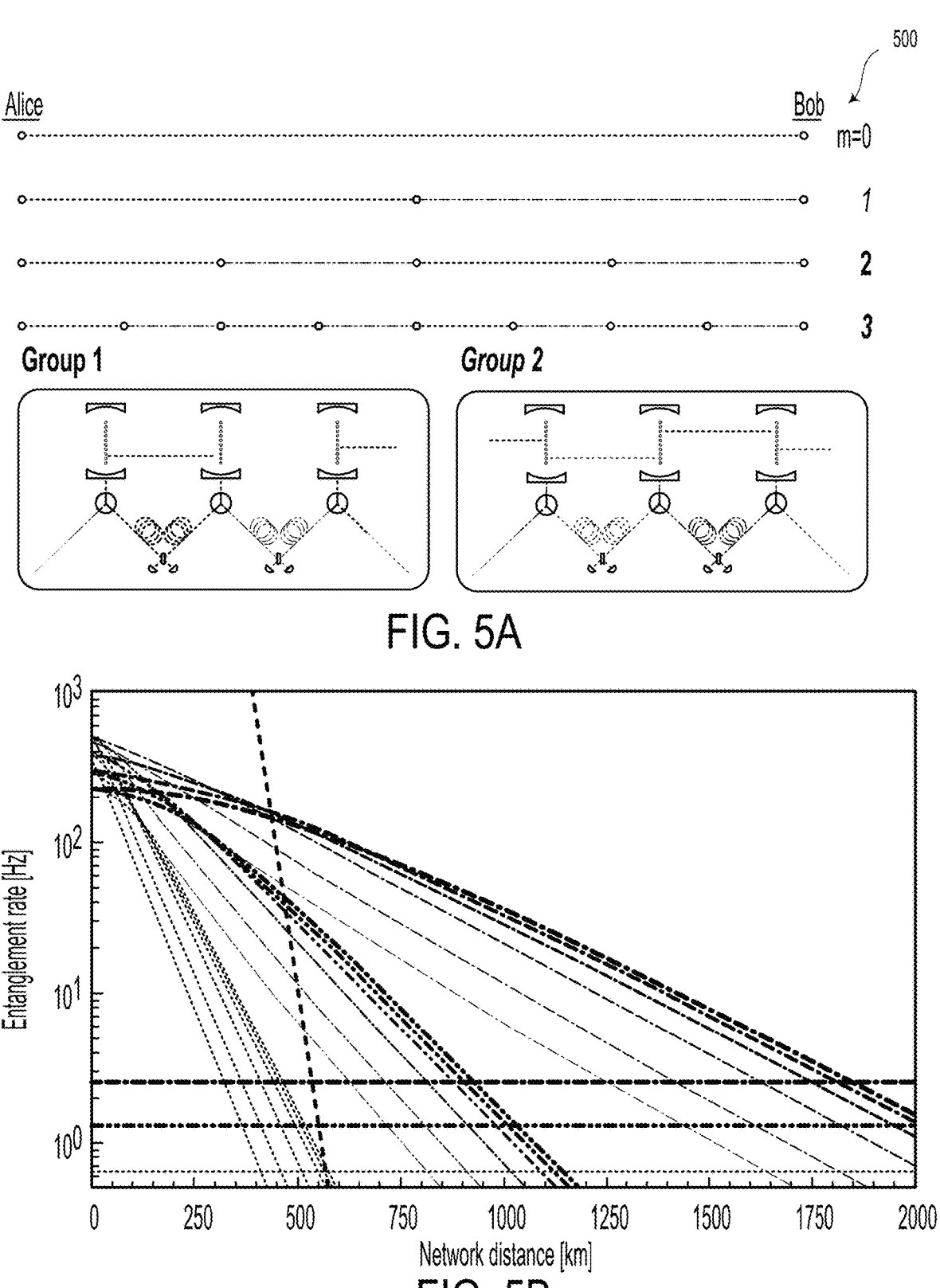
FIG. 5A illustrates network-level entanglement generation, according to an example embodiment.
FIG. 5B illustrates network-level entanglement generation, according to an example embodiment.

FIGS. 5A and 5B illustrate network-level entanglement generation 500, according to an example embodiment. In order to distribute entanglement to end-users Alice and Bob over greater distances, $2^m-1$ intermediate repeater nodes are used, where m is the nesting level. Bell pairs are generated in parallel within Group 1 (blue) and Group 2 (red). Intermediate nodes have two atoms involved in Bell pairs. Simulated entanglement distribution rates over the full network versus the network length L for nesting levels m=2, 3, and 4 with number of atoms per node N shown as the same opacity scale as in FIG. 4. The dashed lines show conservative estimates of the coherence of the qubits at each nesting level. Note that the number of qubits depends on m, so the estimated coherence is $2^m/(2\pi T_2)$. The black dotted line shows for comparison the direct entanglement distribution rate by sending entangled photon pairs at a rate of 10 GHz.

The intermediate links are divided into two groups in alternation such that adjacent links are not in the same group (see FIG. 5A). The described protocol is based on the generation of Bell pairs across all Group 1 links in parallel followed by all Group 2 links in parallel. Naively, the mean time required to generate Bell pairs across all links is approximately twice the mean time required for a single link. However, the number of attempts required to successfully create entanglement follows a geometric distribution and both groups must wait for the success of all constituent links. Hence, the distribution of attempts is stochastically sampled for each link in both groups in order to estimate mean entanglement generation rates at the network level. Note that if N atoms are employed in the multiplexed entanglement generation in Group 1, N−1 atoms are available for generating entanglement in Group 2.

After the Bell pairs have been generated on Group 1 links, the constituent atom at each node in these Bell pairs—recognized by its time stamp—must be isolated and preserved from the subsequent operations on the Group 2 links. Some examples are based on transferring those qubits from the nuclear spin-½ ground state ($^1S_0$) to an auxiliary computational basis of the nuclear spin-½ metastable clock state ($^3P_0$) that has a lifetime of ≈20 s. Accordingly, the (nearly-) clock-magic wavelength of the cavity standing wave-optical tweezer trap system is leveraged. In such scenarios, the metastable clock state is transparent with respect to the four-wave mixing sequence and a negligible relative phase is anticipated on this auxiliary qubit. Transferring the qubit to the auxiliary basis will occur at a rate much faster than the entanglement generation rates over distances of interest and therefore have a negligible effect on the total rate. Rates of $\Omega_{clock} \approx 2\pi \times 100$ kHz and a transfer fidelity of ≳0.99 are anticipated with $^{171}$Yb. Alternatively, the atom(s) could be moved away from the array and the laser fields to preserve coherence during Group 2 operations.

With Bell pairs across all neighboring links, the end-to-end entanglement protocol is completed by entangling atomic pairs and performing deterministic Bell-state measurements at each node to effectively reduce the nesting level of the network by 1. Bell pairs between increasingly distant nodes are traced out of the system through this process until end-users Alice and Bob directly share a Bell pair. Highly-excited Rydberg states are coupled to in order to perform the required local deterministic entanglement operations. As an example in some embodiments, alkaline-earth atoms are coupled from the clock state to Rydberg states in the $^3S_1$ series. However, this interaction occurs only over short distances, requiring the atomic pairs to be re-positioned (see FIG. 1C). The optical tweezers will remove the atoms from the cavity standing wave and translate them to within several microns of each other prior to Rydberg excitation. Tweezer-mediated coherent translation of atomic qubits over such distances is routinely performed on the ~ms timescale with minimal decoherence and Rydberg-mediated gates are on the ≲μs timescale. These steps are again much faster than the entanglement distribution rates and are only performed when remote Bell pairs have been successfully created, so their effect is neglected on the total rate. The expected near-term fidelity of Rydberg-mediated gates and local measurement is ≳0.99, which is high compared to the fidelity of generating Bell pairs: ≈0.982=0.96 (See FIG. 3D).

The network-level entanglement distribution rate for this protocol is based on varied network length L, nesting level m, and atom number per node N. This rate is compared against a conservative estimate of the coherence of all qubits in the system. Naturally, this depends on the nesting level, and hence the network level coherence estimate is $$\Gamma_{coherence}^m = \frac{2^m}{2\pi T_2} = 0.16 \times 2^m \text{ Hz}.$$

FIG. 5B shows the network level generation rate versus the network length for nesting levels m=2, 3, 4 with various atom numbers per node N shown as an opacity scale. Additionally, network generation rate is compared against direct communication (without intermediate nodes) based on entangled photon pairs at a wavelength of 1550 nm with a repetition rate of 10 GHz (dotted line). The direct communication rate falls sharply, passing below present system coherence time estimates at a distance of ≈600 km. In some embodiments, the achievable network length increases for higher nesting level and saturates for N≈200 atoms. In particular, for m=4 the presently described system enables a network of L≈1500 km.

The generation of multiple Bell pairs in the described system is now considered. Multiple Bell pairs are needed in the context of quantum communications for more advanced protocols such as purification and logical encoding. Entanglement purification (also known as distillation) is based on taking two (or more) Bell pairs and consuming them to generate a single Bell pair with higher fidelity. Purification requires entanglement operations between local qubits in the pairs combined with single-qubit readout within each node. The former will again be accomplished with Rydberg-mediated gates while the latter will leverage the auxiliary qubit basis in the metastable clock state to perform single-atom readout by scattering photons from the $_1S_0 \leftrightarrow ^3P_1$ transition, to which the $^3P_0$ clock state is transparent.

To this end, the network-level entanglement generation rate is determined based on network length L with m=4 for various numbers of Bell pairs. The entanglement generation rate associated with generating B Bell pairs in a given attempt decays exponentially with B; hence, a "ladder" scheme is utilized analogous to the network-level analysis. Specifically, B Bell pairs are created one at a time on each link (see FIG. 6A), and still divide the links into two groups. Here again, the distribution of attempts is sampled before the successful generation of each Bell pair on each link, and both Group 1 and 2 are limited by the time for each constituent link to generate B pairs.

The simulated mean entanglement generation rate for B=2 exceeds the decoherence of the B≠$2^m$ Bell pairs for distances up to L≈1100 km. These findings indicate that our platform may be compatible with the development of a transcontinental terrestrial quantum network with sufficiently high fidelity—based on entanglement purification—for subsequent nontrivial operations.

FIGS. 6A and 6B illustrate multiple Bell pairs 600 at the network and single link levels, according to an example embodiment. FIG. 6A illustrates the simulated entanglement distribution rate for m=4 versus network distance for one Bell pair (dot-dashed), two Bell pairs (dot-dot-dashed), and five Bell pairs (dot5-dashed) with N={100, 150, 200} as an opacity scale. The black dotted line is again direct communication at 10 GHz. The horizontal dashed lines are the expected coherence associated with the total number of qubits. For multiple Bell pairs B>1, this is $$\Gamma^{m,B}_{coherence} = B \cdot \frac{2^m}{2\pi T_2}.$$

The maximum distance falls from ≈1500 to ≈1100 km when increasing the number of Bell pair from one to two. FIG. 6B illustrates the entanglement distribution rate of a single link with distance L=50 km to represent a metropolitan-scale network. The rate is plotted versus the number of Bell pairs with N from 10 to 200 as an opacity scale. This shows a favorable scaling with B, and that B=26 Bell pairs can be generated with N=200, where the dashed line is again the expected coherence associated with the total number of qubits. Entanglement of B>N pairs is impossible; hence rates for these data points are omitted.

In some examples, a favorable scaling with B is observed and includes B=5 in FIG. 6A, showing rates exceeding decoherence for distances up to L=500 km.

Additionally, the present embodiments offer the possibility of generating many Bell pairs over a metropolitan-scale link with L=50 km for advanced error correction protocols or for the distribution of many-body states such as logically-encoded qubits, atomic cluster or graph states, spin-squeezed states or Greenberger-Horne-Zeilinger (GHZ) states. The entanglement generation rate versus the number of Bell pairs per link is provided for various N in FIG. 6B. In some embodiments, 26 Bell pairs can be generated for N=200—comparable with the largest GHZ states created locally to date—offering new opportunities for distributed computing and error-corrected networking.

The present disclosure describes a platform that combines the strengths of neutral atoms—efficient light-matter interfaces with telecom operation, high-fidelity qubit operations and measurement, scalability to many qubits, and long coherence times in state-independent optical traps—for the first time to enable new directions in quantum communication and distributed quantum computing. Moreover, the present system and platform can offer dramatic improvements in entanglement generation rates over long distances by time-multiplexing across an array of atoms within each entanglement generation attempt.

Entanglement generation rates with N≈100 atoms across ≳100 km-links compare favorably with conservative estimates of the atoms' coherence time. Multiplexed repeater-based networks with 2^(m=4) links and N≈100 atoms at each node can generate entanglement over ≈1500 km. Additionally, the present system is well-suited for entanglement purification and can achieve a purified network range to ≈1100 km, providing a promising architecture for a transcontinental quantum network. This network architecture is also compatible with heterogeneous hardware, and may be combined with microwave-to-optical transduction to provide a robust network between superconducting quantum processors.

Finally, in various embodiments, larger numbers of Bell pairs may be generated for more advanced protocols such as distributing logically-encoded or other many-body states relevant for quantum computing and metrology. As an example, 26 Bell pairs can be generated over a metropolitan link of 50 km.

More generally, the confluence and advancement of the associated research thrusts—Rydberg atoms arrays, cavity QED with strong atom-photon coupling, and atom-array optical clocks—into one platform will enable new methods to engineer, measure, and distribute many-body entangled states with single-qubit control. For example, the optical cavity can mediate non-demolition measurements that could augment the Rydberg-based quantum computing platform. Conversely, Rydberg-mediated interactions and single-atom control may help to enhance and distribute spin-squeezed states of optical clock qubits generated via the cavity. Finally, the marriage of short-ranged (Rydberg-mediated) and infinite-ranged (cavity-mediated) interactions combined with the possibility of atom-selective control and readout will enable new opportunities for the study of quantum many-body phenomena such as the simulation of magnetism and chaotic dynamics in regimes not readily accessible to classical computers.

FIGS. 7A and 7B illustrate a schematic overview 700 of quantum repeater and purification protocols, according to an example embodiment. The repeater protocol 710 is based on creating two Bell pairs, where end-users Alice and Bob each have half of one pair and the intermediate node has half of both. Then, the combination of a deterministic two-qubit controlled-NOT gate (CNOT), a single-qubit Hadamard gate, and the qubit measurements swaps the entanglement out of the two qubits at the intermediate node and leaves Alice and Bob's halves entangled in a Bell pair with no quantum information remaining at the intermediate node.

The purification protocol 720 is based on creating two Bell pairs, where end-users Alice and Bob each have half of both pairs. A CNOT gate and a single-qubit measurement at both nodes leaves only one Bell pair between Alice and Bob that has higher fidelity than either initial pair. No quantum information remains in the other qubit pair. This purification protocol 720 could be extended to the case of intermediate nodes and could be combined with the repeater protocol. All inner-node single- and two-qubit operations, and measurements for these protocols have been demonstrated in atomic arrays.

For Yb $^3P_J \leftrightarrow ^3D_{J'}$ transitions, there appears to be agreement that the decay rate from $^3D_2$ to $^3P_1$ (the transition of interest in the present disclosure) is $$\Gamma_{^3D_2 \rightarrow ^3P_1} = 2 \times 10^6 s^{-1}$$

and the decay rate from $^3D_2$ to $^3P_2$ is $$\Gamma_{^3D_2 \rightarrow ^3P_2} = 2 \times 10^5 s^{-1}.$$

This corresponds to a branching ratio of the desired decay path of 0.87.

In various embodiments, the optical cavity can characterized by two parameters: the radius of curvature R=5 mm of its two mirrors and the length ℓ=9.75 mm between them. For these parameters, the cavity is near-concentric, and satisfies the stability condition 0≤G²≤1, where G=1−ℓ/R is the cavity stability parameter. The principal mode of the cavity by its waist $w_0$, Rayleigh range $z_0$, and volume $V_m$ using $$w_0 = \left[\left(\frac{\lambda_{3_{D_2 \to 3_{P_1}}} \ell}{2\pi}\right)^2 \left(\frac{1+\mathcal{G}}{1-\mathcal{G}}\right)\right]^{1/4}, \qquad \text{(Eq. 1)}$$

$$z_0 = \frac{\pi w_0^2}{\lambda_{3_{D_2 \to 3_{P_1}}}}, \qquad \text{(Eq. 2)}$$

$$V_m = \frac{\pi}{4} w_0^2 \ell, \qquad \text{(Eq. 3)}$$

where $$\lambda_{3_{D_2 \to 3_{P_1}}}$$

is the wavelength of the targeted telecom transition, 1480 nm. Additionally, in some embodiments, the cavity has an intrinsic finesse $F_{int}=10^5$, transmission linewidth $\kappa_{int}=2\pi \times c/2 \ell F_{int} \approx 2\pi \times 154$ kHz, and free spectral range FSR=$c/2 \ell \approx 15.4$ GHz. For a chosen extrinsic finesse $F_{ext}=5 \times 10^4$ ($\kappa_{ext} \approx 2\pi \times 307$ kHz), this gives a photon collection efficiency of $\eta_{coll}=1-F_{ext}/F_{int}=0.5$.

The atom-cavity interaction parameters include the electric dipole matrix element D for our chosen transition is $$D = \left[\frac{3\pi\varepsilon_0 \hbar c^3}{\omega_{3_{D_2 \to 3_{P_1}}}^3} \Gamma_{3_{D_2 \to 3_{P_1}}} \begin{Bmatrix} J & J' & 1 \\ F' & F & I \end{Bmatrix} (2F'+1)(2J'+1)\right]^{1/2}, \qquad \text{(Eq. 4)}$$

where $$\omega_{3_{D_2 \to 3_{P_1}}} \approx 2\pi \times 202 \text{ THz,}$$

$$\Gamma_{3_{D_2 \to 3_{P_1}}} = 2\pi \times 318 \text{ kHz}$$

and the term in braces is the Wigner 6-j symbol, giving D$\approx$1.96$\times$10$^{-29}$ C m. Using this, the coherent coupling to the cavity mode is $$g_{34} = \frac{D}{\hbar}\left[\frac{\hbar\omega_{3_{D_2 \to 3_{P_1}}}}{2\varepsilon_0 V_m}\right]^{1/2} \approx 2\pi \times 1.53 \text{ MHz,} \qquad \text{(Eq. 5)}$$

which gives cooperativity $$C = g_{34}^2/\kappa\Gamma_{3_{D_2 \to 3_{P_1}}} \approx 16.0$$

with $\kappa=\kappa_{int}+\kappa_{ext}$. Then the probability of emitting a telecom photon into the cavity mode is $P_{cavity}$=C/(C+1)$\approx$0.941, and hence the probability of extracting this photon is $\eta_{extract}$=$P_{Cavity}\eta_{coll}$=0.471.

FIG. 8 illustrates relevant levels of four-wave mixing 800, according to an example embodiment. States $|0\rangle$ to $|4\rangle$ were considered for the simulation to estimate the success probability and fidelity. During the excitation cycle, the population in the levels $|2\rangle$ and $|4\rangle$ decay to state $^3S_0$ with a decay rate $$\gamma_{1_{S_0}} = 2\pi \times 182 \text{ kHz,}$$

and population in state $|3\rangle$ decays to state $^3P_1$ and $^3P_2$ with decay rate $$\gamma_{3_{P_1}} = 2\pi \times 318 \text{ kHz}$$

and $$\gamma_{3_{P_2}} = 2\pi \times 48 \text{ kHz,}$$

respectively. For simulation purposes, all decays are assumed to accumulate in a dump level that does not contribute to the coherent evolution.

The atom-telecom photon entanglement generation protocol is similar to the four-level scheme previously shown for rubidium and cesium atoms coupled to nanophotonic cavities. The protocol starts with initializing atom in the superposition state $(|0\rangle_a + |1\rangle_a)/\sqrt{2}$.

This is followed by a pulse sequence that takes the atom through states $|1\rangle \to |4\rangle$ before returning back to the initial state $|1\rangle$. First, pulse $\Omega_{12}$ transfers population from state $|1\rangle$ to $|2\rangle$. Then the population is excited to state $|3\rangle$ by light field $\Omega_{23}$, which is always on. The population that reaches the state $|3\rangle$ is preferentially transferred to state $|4\rangle$ via the emission of a telecom photon into the cavity, which is resonant with the $|3\rangle \leftrightarrow |4\rangle$ transition. A second pulse, $\Omega_{41}$, then transfers the population in the state $|4\rangle$ back to state $|1\rangle$. The spontaneous decay from excited states (see FIG. 8) limit the coherent completion of this cycle and leads to infidelities. Fidelity is defined as the probability of finding the atom in the qubit state after the round-trip through states $|1\rangle \to |4\rangle$, given the heralding of the telecom photon.

The requirement of heralding makes this scheme robust to any atomic decays preceding the photon emission into the cavity and limits the infidelities to decays from the state $|1\rangle$ The optimum parameters for the given pulse sequence are extracted using a two-step optimization process. The first step optimizes the Rabi frequencies $\Omega_{12}$, $\Omega_{23}$ and the pulse width of $\Omega_{12}$ to maximize the population transfer to the state $|4\rangle$ and the second step optimizes the timing, pulse width, and Rabi frequency of $\Omega_{41}$. In both the schemes below, the success probability accounts for the probability $P|1\rangle$ for the initial population in $|1\rangle$ to emit a telecom photon and return to $|1\rangle$, as well as the probability for the emitted photon to couple to the external coupling mode of the cavity; i.e.

$$\text{Success probability} = \frac{\kappa_{ext}}{\kappa_{int}} P_{|1\rangle} \qquad \text{(Eq. 6)}$$

FIGS. 9A and 9B illustrate a detuned four-wave mixing scheme 900, according to an example embodiment. FIG. 9A illustrates a time evolution of the coherent population in the states $|1\rangle$ to $|4\rangle$ and the photon emitted from the cavity through external coupling parameter $\kappa_{ext}$. The top half of the plot shows pulses $\Omega_{12}$ and $\Omega_{41}$. In the simulation, the first pulse is assumed to have a constant length of 65 ns and the length of the second pulse is optimized for each value of the detuning. Here, both pulses have a 20 ns ramp time. FIG. 9B illustrates scaling of fidelity and success probability with detuning. Larger detuning leads to lower occupation and decay from state $|4\rangle$ at the cost of lower coherent population transfer back to state $|1\rangle$.

15              16

In the first case, which is termed the "resonant case," the cavity is resonant with the $|3\rangle \leftrightarrow |4\rangle$ transition. In this case the corresponding Hamiltonian in an appropriately chosen rotating frame is $$\hat{H} = \Omega_{12}(t)|1\rangle\langle 2| + \Omega_{12}|2\rangle\langle 3| + g_{34}\hat{a}'|3\rangle\langle 4| + \Omega_{41}(t)|4\rangle\langle 1| + H.c. \quad \text{(Eq. 7)}$$

In this resonant excitation scheme, the population transfer to $|4\rangle$ occurs over a time scale that is inversely proportional to atom-cavity coupling $g_{34}$, and for efficient completion, the second pulse has to be timed to match. The earlier coherent transfer spend a longer time in $|4\rangle$ leading to spontaneous decay. To minimize the contribution to infidelity, we transfer the population from $|4\rangle$ at earlier times, trading fidelity gains for reduced efficiency, due to incomplete population transfer. Here we achieve this by applying $\Omega_{41}$ earlier than what is optimal for the complete population transfer shown in FIG. 3C. The increase in fidelity and corresponding reduction in the efficiency are shown in FIG. 3D. Fixed Gaussian pulses with full widths at half maximum 116 ns and 58 ns were used for $\Omega 12$ and $\Omega_{41}$, respectively. Here, the achieved fidelities were conditioned on heralding entanglement using the photons that were emitted until the coherent transfer back to the initial qubit state by $\Omega_{41}$. Detection of photons emitted from the cavity after the completion of $\Omega_{41}$ leads to additional infidelities.

High-fidelity atom-telecom photon entanglement can also be obtained by using an off-resonant scheme, where the population transfer to $|4\rangle$ is minimized, since decay from this state is the dominant error in the heralding protocol. In this case the Hamiltonian considered is $$\hat{H} = \Omega_{12}(t)|1\rangle\langle 2| + |\Omega_{23}|2\rangle\langle 3| + g_{34}\hat{a}|3\rangle\langle 4| + \Omega_{41}(t)|4\rangle\langle 1| + \delta|4\rangle\langle 4| + H.c. \quad \text{(Eq. 8)}$$

In this scheme, the optimal fidelities were also found by a two-step optimization procedure. For a given detuning, the first step maximized the population transfer to $|3\rangle$ by optimizing the Rabi frequencies $\Omega_{12}$, $\Omega_{23}$ and the pulse width of $\Omega_{12}$, and the second step optimizes the duration and Rabi frequency of $\Omega_{41}$ to maximize the population transfer from $|3\rangle$ to $|1\rangle$ through the two-photon process. Here, the pulse length of $\Omega_{12}$ is fixed to 65 ns including a linear ramp time of 20 ns. The length of $\Omega_{41}$ varies from 300 ns to 500 ns according to the varied detuning. Similar to the resonant case we again find that higher fidelities can be obtained at the cost of lower success probabilities (See FIG. 9A). Incomplete population transfer in both schemes will lead to some residual population left behind in the states that are coupled to the cavity, which can lead to photon emission even after the end of the pulse sequence. Detection of these photons will add to infidelity. Overall success probabilities were found to be greater for the resonant scheme that is used in the main text for relevant calculations.

We consider the importance of phase matching and momentum conservation of the four light fields that have overlapping amplitude during our four-wave scheme. A qualitative estimate is formed based on classical fourwave mixing analysis in which an outgoing wave is produced by the interaction of three incoming waves with a nonlinear medium. The outgoing field intensity is proportional to a phase-matching factor whose argument is $\xi = \Delta k \times L$, where $\Delta k = |\vec{k}_{12} + \vec{k}_{23} - \vec{k}_{34} - \vec{k}_{41}|$ and L is the effective overlap length of the four fields which in practice is determined by their size or the size of the medium (whichever is smaller). The phase matching factor is equal to one when $\xi = 0$ and decreases for $\xi >> 0$.

For the beam configuration shown in FIG. 3B, assuming a 180° angle between $\vec{k}_{12}$ and $\vec{k}_{41}$ and a 45° angle between $\vec{k}_{34}$ and $\vec{k}_{23}$, we estimate that $\Delta k \approx 2\pi/(1500 \approx 2)$ nm. The relevant length scale of the single-atom case should be the size of the atomic wavefunction in the optical trap, which we assume is $L_{single} \approx 50$ nm. Hence, we estimate that $\xi < 1$ for the case we consider here, so phase matching of the four light fields is not crucial. Accordingly phase matching is neglected it in our analysis, but a beam geometry is chosen to easily minimize $\Delta k$. However, perfect phase matching can be achieved by injecting the pump field $\Omega_{23}$ through the cavity. By careful engineering of the cavity free spectral range and with a judicious choice of magnetic field, it is possible to overlap the required frequency for $\Omega_{23}$ with a cavity resonance, thereby creating a perfectly phase-matched condition.

For an atomic ensemble or a solid-state spin ensemble, this factor would be much higher. Assuming L=10 µm with the same beam geometry, $\xi >> 10$. Hence, phase matching is often crucial in ensemble and crystalline environments.

Some entanglement distribution calculations are described now. Starting by considering the rate $\Gamma_{link}$ at which entanglement between two adjacent network nodes can be attempted. This rate comprises all components shown in FIG. 2. The time to cool and initialize all atoms at the nodes, performed globally and in parallel over the arrays of atoms at both nodes, is $1/\Gamma_{init} = 1/10$ kHz. This is based on the maximum scattering rate from the $^3P_1$ $$^3P_1\left(\Gamma_{^3P_1} \approx 90 \text{ kHz}\right)$$

and an assumption about the number of photons required for cooling and optical pumping. The total qubit pulse time comprising globally applied $\pi/2$- and $\pi$-pulses (see FIG. 2C) is $1/\Gamma_{\pi/2} + 1/\Gamma_\pi = 3/\Gamma_{\pi/2}n = 3/100$ kHz, based on an assumed Rabi frequency of 50 kHz via stimulated Raman pulses between the nuclear spin states. The total four-wave-mixing time is $2N/\Gamma_{FWM} = 2N/200$ kHz for all N atoms. The four-wave-mixing rate is determined by the time between when the sequence begins and when the photon leaves the cavity with high probability (see FIG. 3C). Finally, the time to transmit classical signals through fibers and to herald entanglement is $1/\Gamma_{comm}(L) = c/2L \approx 10^8$ m s$^{-1}$/L.

Using these quantities, $\Gamma_{link}$ is:

$$\Gamma_{link}(L, N) = \left[\frac{1}{\Gamma_{init}} + \frac{3}{\Gamma_{\pi/2}} + \frac{2N}{\Gamma_{FWM}} + \frac{1}{\Gamma_{comm}(L)}\right]^{-1} \quad \text{(Eq. 9)}$$

The exact values used for these rates are summarized in the table in FIG. 11. It will be noted that the rate between the time bins for cases with a large array of atoms can fall to the kHz level and it is necessary to consider possible phase fluctuations that might occur between the time bins. Phase shifts due to path length fluctuations that are induced by thermal and mechanical effects occur with sub-kHz bandwidths. Moreover, fiber phase noise cancellation could be actively applied to these fiber paths with an additional, classical, CW field. The modulator for this phase stabilization loop can be shared with the single photon pulses to noninvasively provide phase stabilization for the quantum interference process. This technique is quite commonplace; the two fields can be combined with dichroic mirrors if their wavelengths are slightly different; and the modulator can operate with <10% loss.

The probability p of successfully creating a single Bell pair between any given two atoms at adjacent nodes similarly comprises several components;

$$p(L) = \left(\frac{1}{2}\right)^2 \eta_{FWM}^2 \eta_{fiber}^2 \eta_{det}^2 \eta_{att}(L).$$ (Eq. 10)

Here, $\eta_{FWM} \approx 0.364$ is the total success probability of the four-wave-mixing scheme under the condition shown in FIG. 3D; $\eta_{fiber} = \eta_{det} = 0.9$ are the efficiencies at which photons may be collected by their respective fibers and subsequently detected; and $\eta_{att}(L) = \exp(-L/\lambda_{att})$ is the attenuation of the telecom photons ($\lambda_{att} = 20.7$ km at 1480 nm). The two leading factors of $\frac{1}{2}$ are due to the overlap between the Bell-state and computational bases and an assumed complete loss of photon polarization in the long-distance fibers. Note that polarizers are utilized after the fibers to ensure indistinguishability of the photons prior to interfering them. It follows that the total probability $P_{max}$ of creating at least B Bell pairs between adjacent nodes through multiplexing is $$P_{max}(L, N, B) = \sum_{k=B}^{N} \binom{N}{k} p^k (1-p)^{N-k}$$ (Eq. 11)

for $N \geq B$ and zero otherwise.

To calculate the rate $\Gamma_{max}$ at which these B or more Bell pairs can be formed between atoms at adjacent network nodes, a total number of times M that the entire procedure is attempted in considered. While M is in principle unbounded, it is realistic to choose M such that the mean number of successful attempts $MP_{mux}(L,N,B)$ to create $\geq B$ Bell pairs is one, and hence the average success rate is that at which these M attempts can be performed, $$\Gamma_{max}(L, N, B) = L_{link}(L, N) \times P_{max}(L, N, B).$$ (Eq. 12)

Generalizing to the network-level procedure, the two-group structure requires an extra consideration. The proposed protocol requires that entanglements in Group 1 complete before those in Group 2 can be attempted, which precludes the derivation of an analytical formula to describe the expected rates; hence numerical simulations are utilized to calculate the results shown in FIGS. 5B and 6A. A simple simulation scheme is provided based on stochastically sampling the probability distribution over M attempts required for the formation of Bell pairs across each network link in accordance with Eq. 11, which gives $M = 1/P_{mux}$ for one success across a link for given N, L, and B. For our simulations, M—which follows a geometric distribution—is sampled by counting the number of random events required for a single success, which occurs with probability $P_{mux}$. The resulting averages of these counts over 10,000 trials are in good agreement with the expected value obtained using Eq. 11. The time taken for each linking attempt is then $M/\Gamma_{link}$, and the mean of a set of Q such trials can be inverted to find the average entanglement rate. It was found that this scheme could be used for as few as Q=1000 trials to faithfully reproduce FIG. 4.

At the network level, the results shown in FIGS. 5B and 6A were calculated following the two-group protocol as described. The single-link linking time $M/\Gamma_{link}$ was singly sampled for each of the $2^{m-1}$ network links in Group 1, from which the maximum was selected. This sampling was repeated for $2^{m-1}$ links in Group 2 (for N−1 atoms at each node), and the two maxima were added to find the total time required for the network. The mean of Q=5000 such trials was then inverted to calculate the average rate for each value of m, N, and L shown. For the multi-Bell case shown in FIG. 6B, the single single-link procedure described in the previous paragraph was repeated for B Bell pairs following the "ladder" scheme, the total time for B linking attempts averaged over Q=5000 trials, and the average inverted for each value of N and B shown.

FIG. 10 illustrates a simulation of the mean number of attempts to form a Bell pair across a single link, according to an example embodiment. The simulated mean number of attempts M required for the formation of one Bell pair across a single link for various N at L=100 km (circles), averaged over 10,000 trials, are compared in the main plot with the expected analytically derived result $M = 1/P_{max}$ (black dashed line). The error bars show the one-sided RMS deviation from the mean. The inset shows the distribution over values of M associated with the N=10 data point along with the mean of the distribution (gray dotted line) and analytical result (black dashed line).

FIG. 11 illustrates a table showing rates for constituent steps in the single-link multiplexing protocol, according to an example embodiment. Rates for constituent steps in the single-link multiplexing protocol. Exact values for rates composing the total rate at which entanglement between two adjacent network nodes $\Gamma_{link}$ can be attempted in terms of the per-node atom number N and distance in fiber between nodes L. The listed steps correspond chronologically to the colored time windows shown in FIGS. 2A and 2B.

The fidelity of the atom-photon and atom-atom Bell states is now estimated. Photon indistinguishability and photon-photon interference contrast, which play a crucial role in generating atom-atom entanglement from two atom-photon pairs. The photon-photon interference contrast is defined as an overlap integral of the two photon's wavefunctions, which can be factorized into: (1) a spatial function, (2) a temporal function, and (3) an electric field function describing the polarization vector. Accordingly, the two-photon overlap fidelity $F_{p-p} = F_R F_T F_\chi$ can be defined as the product of (1) a spatial overlap fidelity $F_R$, (2) a temporal overlap fidelity $F_T$, and (3) a polarization overlap fidelity $F_\chi$.

(1) The temporal profile of the photon—assuming no dispersion and perfect relative timing—is shown in FIG. 3C. The latter assumption is reasonable at this relatively low, ~MHz bandwidth. This temporal profile is determined by the cavity linewidth, which can be replicated between cavities at the several percent level. Hence, it is assumed $F_T \gtrsim 0.97$.

(2) Since a single-mode optical fiber is used, imperfections in the spatial wavefunction can be assumed to be small, where $M^2 = 0.99$ of the $TEM_{0,0}$ mode should be readily available with fiber outcouplers. $F_R \approx 0.99^2 = 0.98$.

(3) The polarization purity is determined by the extinction of polarizing beamsplitters after each fiber and before the 50:50 beamsplitter. Assuming <1/1000 control of the polarization with Glan-Thompson polarizers, the polarization overlap will be limited only by angular alignment errors. Accordingly, $F_\chi \approx 0.99$ is a realistic assumption.

To estimate the total atom-atom Bell state fidelity, the atom-photon Bell state is assumed from the main text $F_{atom-photon} \approx 0.98$ as well as the two-photon overlap fidelity $F_{p-p} \approx 0.94$: $F_{atom-atom} \approx F^2_{atom-photon} F_{p-p} \gtrsim 0.90$. This atom-atom Bell state fidelity can be enhanced with entanglement purification by consuming extra Bell pairs as discussed elsewhere.

While examples herein describe the generation of atom-atom Bell pairs at various nodes and intermediate repeaters using a nested quantum teleportation process, it will be understood that other ways to form atom-atom Bell pairs are possible and contemplated.

II. EXAMPLE SYSTEMS

FIG. 12 illustrates a quantum networking system 1200, according to an example embodiment. The quantum networking system 1200 includes at least one quantum repeater node 1210. In an example embodiment, the quantum repeater node 1210 could be configured to perform high-rate multiplexed entanglement generation as described herein. The quantum networking system 1200 could involve and/or be configured to incorporate similar or identical elements as that of quantum network architecture 100 of FIG. 1A, multiplexed remote entanglement generation 200 of FIG. 2B, four-pulse excitation scheme 300 of FIG. 3A, network-level entanglement generation 500 of FIG. 5A, and/or multiple Bell pairs 600 of FIG. 6A, among other elements described herein.

The quantum repeater node 1210 includes an array of neutral atoms 1220 disposed in an optical cavity 1230. In such scenarios, the array of neutral atoms 1220 includes a plurality of neutral ytterbium ($^{171}$Yb) atoms. For example, the array of neutral atoms 1220 could be formed using one or more optical tweezers. The quantum repeater node 1210 is configured to operate within a telecommunication wavelength band between 1260 nm and 1675 nm. As an example, the quantum repeater node 1210 could be configured to emit a photon with wavelength around 1480 nm, which is related to an energy transition between neutral atom quantum states.

In various examples, the array of neutral atoms 1220 could include a linear arrangement of neutral atoms with an array length 1222 of between 150 microns and 250 microns. It will be understood that other array lengths are possible and contemplated. For example, the array length could vary between 100 microns to 300 microns; or between 50 microns and 500 microns. Other lengths are possible. Additionally or alternatively, the array of neutral atoms 1220 could include a linear array of between 20 and 200 neutral atoms. It will be understood that other amounts of neutral atoms are possible and contemplated. For example, the array of neutral atoms 1220 could include between 5 and 500 neutral atoms.

At least a portion of the neutral atoms of the array of neutral atoms 1220 may be configured to perform Rydberg entangling operations. Additionally or alternatively, the array of neutral atoms 1220 could be confined to the optical cavity 1230 by a standing wave in a trapped ion system.

In some scenarios, the optical cavity 1230 could include a pair of near-concentric mirrors 1232. In such examples, the near-concentric mirrors 1232 could be spherically symmetric. In various embodiments, the pair of near-concentric mirrors 1232 are separated by a mirror spacing 1234 of between 0.5 cm and 1.5 cm. In other example embodiments, the near-concentric mirrors 1232 could be separated by a different mirror spacing 1234. For example, distances between 0.25 cm to 2 cm are possible and contemplated.

The quantum repeater node 1210 also includes a fiber-optic switch (FOS) 1240. In such scenarios, the FOS 1240 is optically coupled to the optical cavity 1230.

The quantum networking system 1200 includes at least one beamsplitter 1250. The at least one beamsplitter is optically coupled to the FOS 1240.

The quantum networking system 1200 also includes a photon detector (PD) 1260 that is optically coupled to the optical cavity 1230 via the beamsplitter 1250. In some embodiments, the PD 1260 is configured to provide information indicative of which atoms at each of the quantum repeater nodes are in a Bell state.

In some embodiments, the quantum networking system 1200 includes a further quantum repeater node 1280. As an example, the further quantum repeater node 1280 could include a further array of neutral atoms 1282 disposed in a further optical cavity 1284. The further quantum repeater node 1280 also includes a further FOS 1286. In such scenarios, the further FOS 1286 could be optically coupled to the at least one beamsplitter 1250. As an example embodiment, the further array of neutral atoms 1282 could be configured to generate a quantum entangled Bell pair 1288 with respect to the array of neutral atoms 1220. In such scenarios, the Bell pair 1288 comprises a two-qubit quantum state. In various embodiments, the quantum networking system 1200 could be configured to provide 25 or more Bell pairs 1288.

In some example embodiments, the Bell pairs 1288 could undergo an entanglement purification process 1290 to produce Bell pairs with higher fidelity.

As an example, the quantum networking system 1200 could provide a distributed, fault-tolerant, quantum computer.

Additionally or alternatively, the quantum networking system 1200 could include a further PD 1292. In such scenarios, the further PD 1292 could be optically coupled to the at least one beamsplitter 1250. That is, the further PD 1292 could be configured to provide information indicative of which atoms in the further array of neutral atoms 1282 are in a Bell state.

III. EXAMPLE METHODS

FIG. 13 illustrates a quantum networking method 1300, according to an example embodiment. The quantum networking method 1300 includes one or more blocks or steps that could be performed in one or more different orders. Some blocks or steps may be skipped, omitted, and/or repeated. In some example embodiments, the quantum networking method 1300 could be carried out using systems and devices described herein, including, but not limited to, quantum networking system 1200, described and illustrated in reference to FIG. 12. The quantum networking method 1300 could involve and/or be configured to incorporate similar or identical elements as that of quantum network architecture 100 of FIG. 1A, multiplexed remote entanglement generation 200 of FIG. 2B, four-pulse excitation scheme 300 of FIG. 3A, network-level entanglement generation 500 of FIG. 5A, and/or multiple Bell pairs 600 of FIG. 6A, among other elements described herein.

Block 1302 includes providing a first array of neutral atoms (e.g., array of neutral atoms 1220) in a first quantum repeater node (e.g., quantum repeater node 1210). In various examples, providing the array of neutral atoms could be performed by way of one or more optical tweezers.

Block 1304 includes providing a second array of neutral atoms (e.g., further array of neutral atoms 1282) in a second quantum repeater node (e.g., further quantum repeater node 1280).

Block 1306 includes performing atom-photon entanglement of at least one neutral atom of the first array of neutral atoms via a four-wave mixing process so as to form a plurality of atom-photon Bell pairs (e.g., Bell pairs 1288).

Block 1308 includes distributing entangled Bell pairs between the first quantum repeater node and the second quantum repeater node.

Block 1310 includes performing an entanglement purification processes (e.g., entanglement purification 1290) on two or more Bell pairs to produce at least one new Bell pair with higher fidelity.

IV. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A quantum networking system comprising:
   at least one quantum repeater node, wherein the quantum repeater node comprises:
   an array of neutral atoms disposed in an optical cavity, wherein the array of neutral atoms is formed by using one or more optical tweezers;
   a fiber-optic switch (FOS), wherein the FOS is optically coupled to the optical cavity; and
   at least one beamsplitter, wherein the at least one beamsplitter is optically coupled to the FOS.

2. The system of claim 1, wherein the quantum repeater node is configured to perform multiplexed entanglement generation.

3. The system of claim 1, wherein the quantum repeater node is configured to operate within a telecommunication wavelength band between 1260 nm and 1675 nm.

4. The system of claim 1, wherein the array of neutral atoms comprises a plurality of neutral ytterbium ($^{171}$Yb) atoms.

5. The system of claim 1, wherein the array of neutral atoms comprises a linear arrangement of neutral atoms with an array length of between 100 microns and 300 microns.

6. The system of claim 1, wherein the array of neutral atoms comprises a linear array of between 5 and 500 neutral atoms.

7. The system of claim 1, wherein at least a portion of the neutral atoms of the array of neutral atoms are configured to perform Rydberg entangling operations.

8. The system of claim 1, wherein the optical cavity comprises a pair of near-concentric mirrors.

9. The system of claim 8, wherein the near-concentric mirrors are spherically symmetric.

10. The system of claim 8, wherein the pair of near-concentric mirrors are separated by a mirror spacing of between 0.25 cm and 2.0 cm.

11. The system of claim 1, wherein the system further comprises a photon detector (PD) that is optically coupled to the optical cavity via the beamsplitter, wherein the PD is configured to provide information indicative of which atoms at each of the quantum repeater nodes are in a Bell state.

12. The system of claim 1, wherein the system further comprises a further quantum repeater node, wherein the further quantum repeater node comprises:
   a further array of neutral atoms disposed in a further optical cavity; and a further FOS, wherein the further FOS is optically coupled to the at least one beamsplitter, wherein the further array of neutral atoms is configured to generate a quantum entangled Bell pair with respect to the array of neutral atoms.

13. The system of claim 12, wherein the system provides a distributed, fault-tolerant, quantum computer.

14. The system of claim 12, wherein a Bell pair comprises a two-qubit quantum state.

15. The system of claim 12, wherein the system is configured to provide 25 or more Bell pairs.

16. The system of claim 15, wherein the Bell pairs undergo an entanglement purification process to produce Bell pairs with higher fidelity.

17. The system of claim 12, wherein the system further comprises a further PD, wherein the further PD is optically coupled to the at least one beamsplitter, wherein the further PD is configured to provide information indicative of which atoms in the further array of neutral atoms are in a Bell state.

18. A quantum networking method comprising:

providing a first array of neutral atoms in a first quantum repeater node;

providing a second array of neutral atoms in a second quantum repeater node, wherein providing the first array of neutral atoms and providing the second array of neutral atoms is performed by way of one or more optical tweezers;

performing atom-photon entanglement of at least one neutral atom of the first array of neutral atoms via a four-wave mixing process so as to form a plurality of atom-photon Bell pairs;

distributing entangled Bell pairs between the first quantum repeater node and the second quantum repeater node; and performing an entanglement purification processes on two or more Bell pairs to produce at least one new Bell pair with higher fidelity.

* * * * *